Figure 1E:
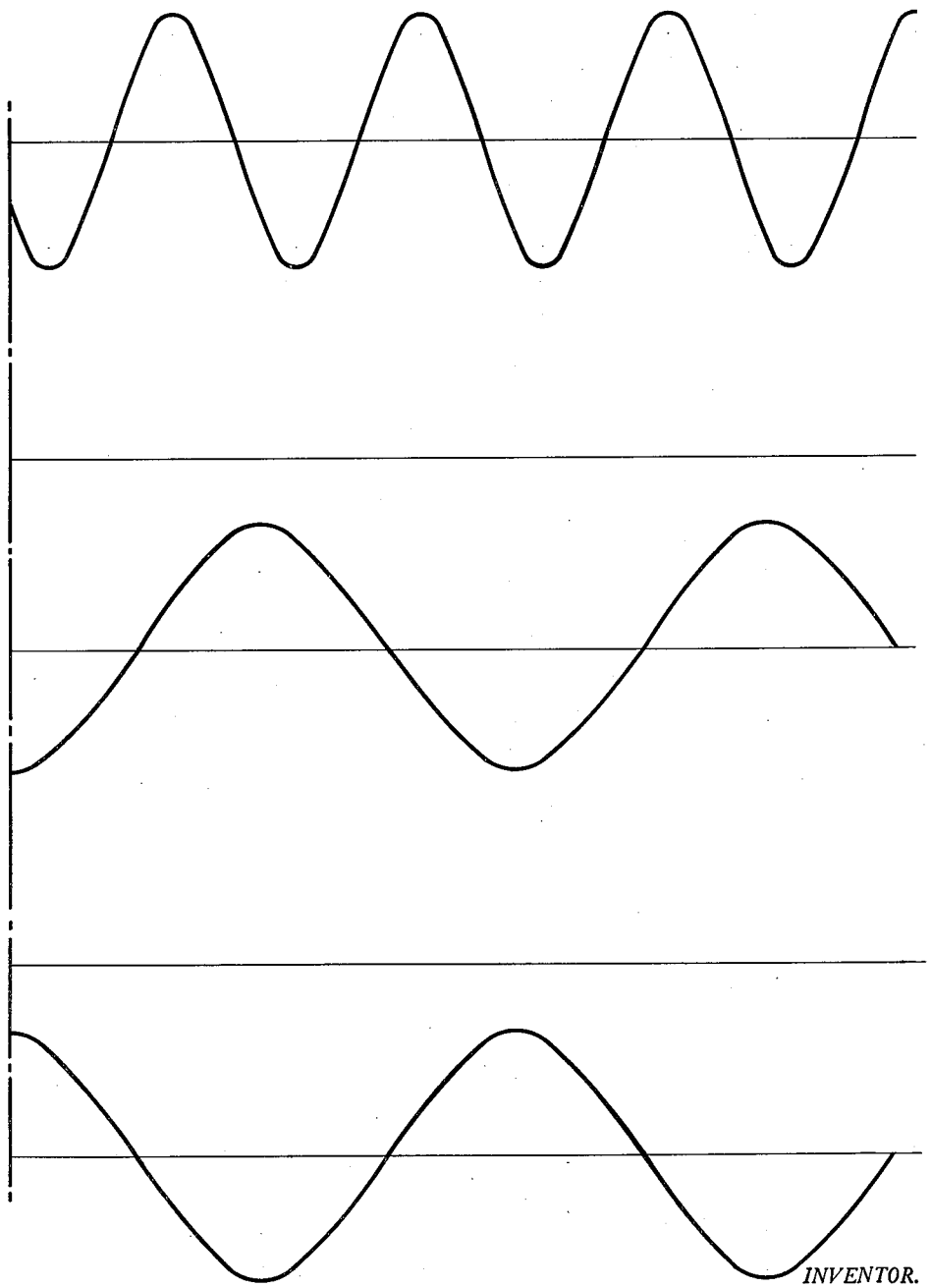

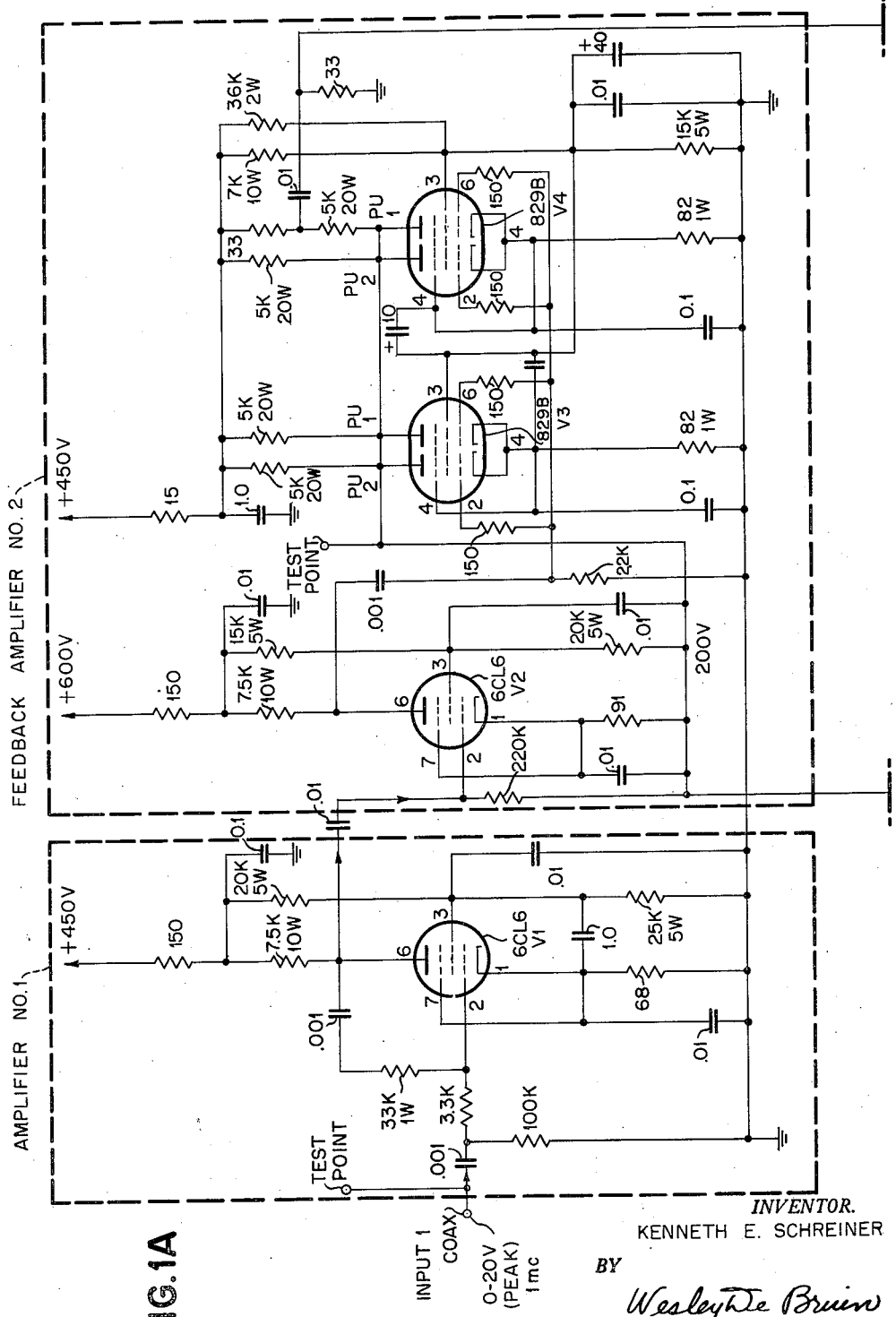

Sept. 19, 1961 K. E. SCHREINER 3,000,564
ELECTRONIC APPARATUS
Filed July 15, 1957 14 Sheets-Sheet 2
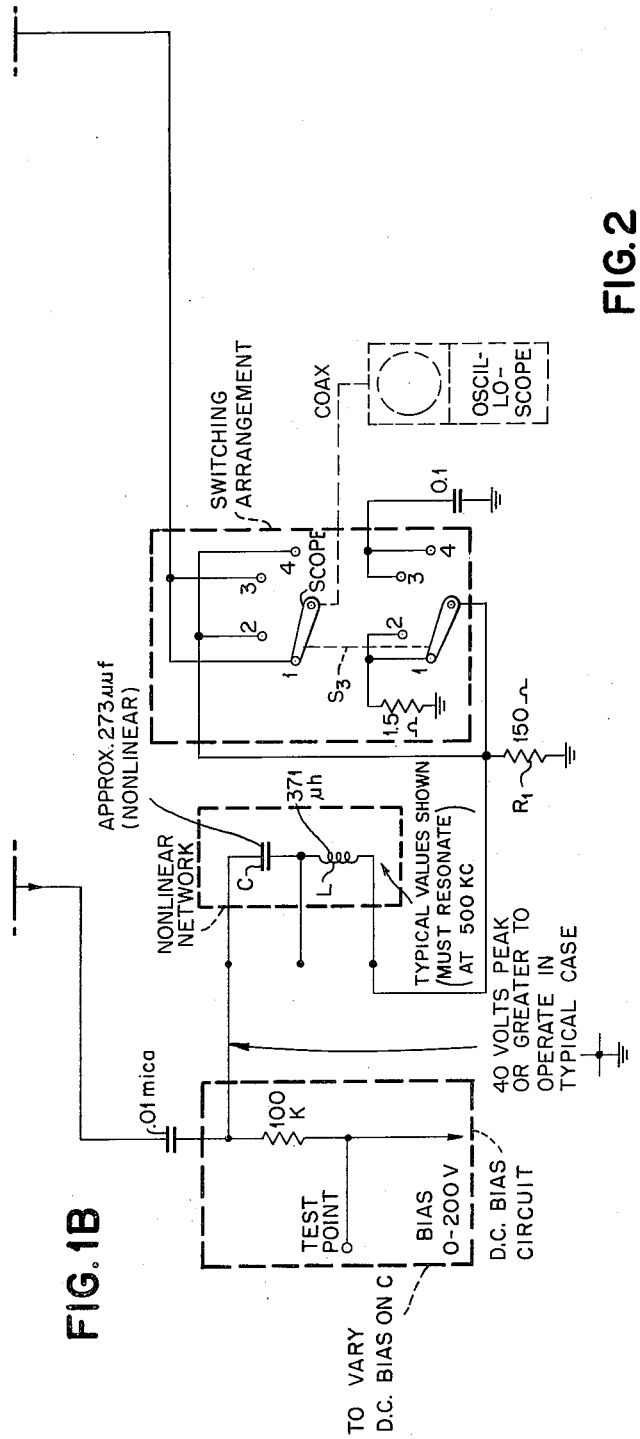
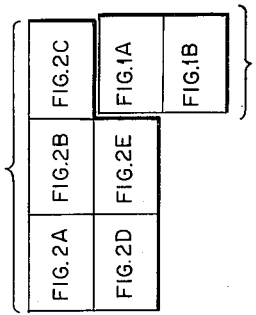
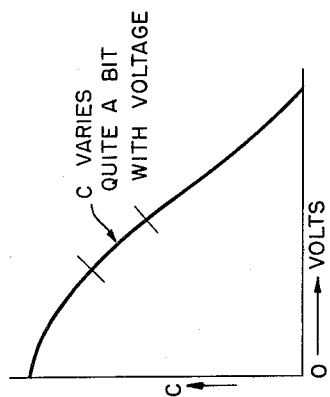
FIG. 3
INVENTOR.
KENNETH E. SCHREINER
BY
Wesley De Bruin
ATTORNEY

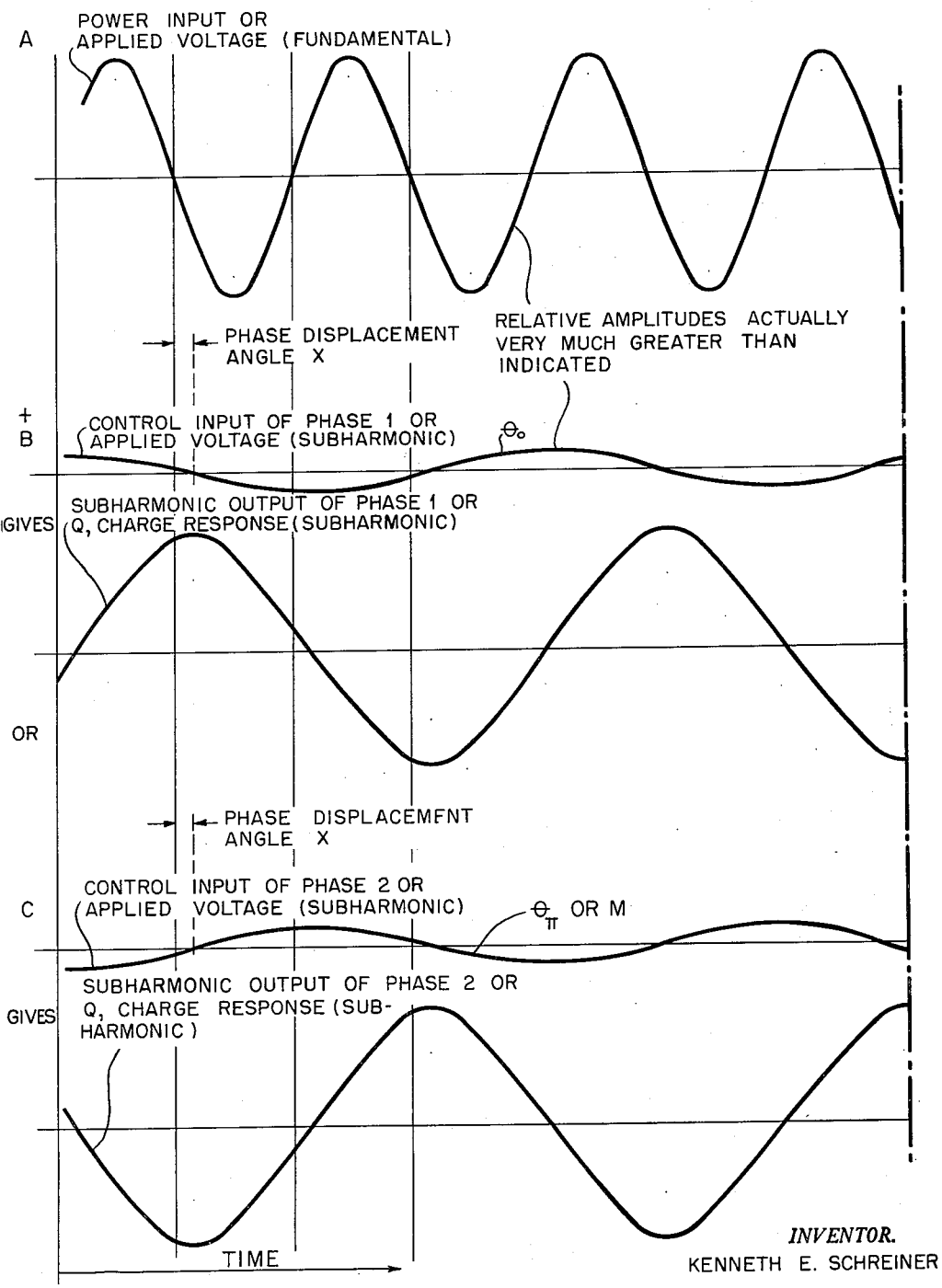

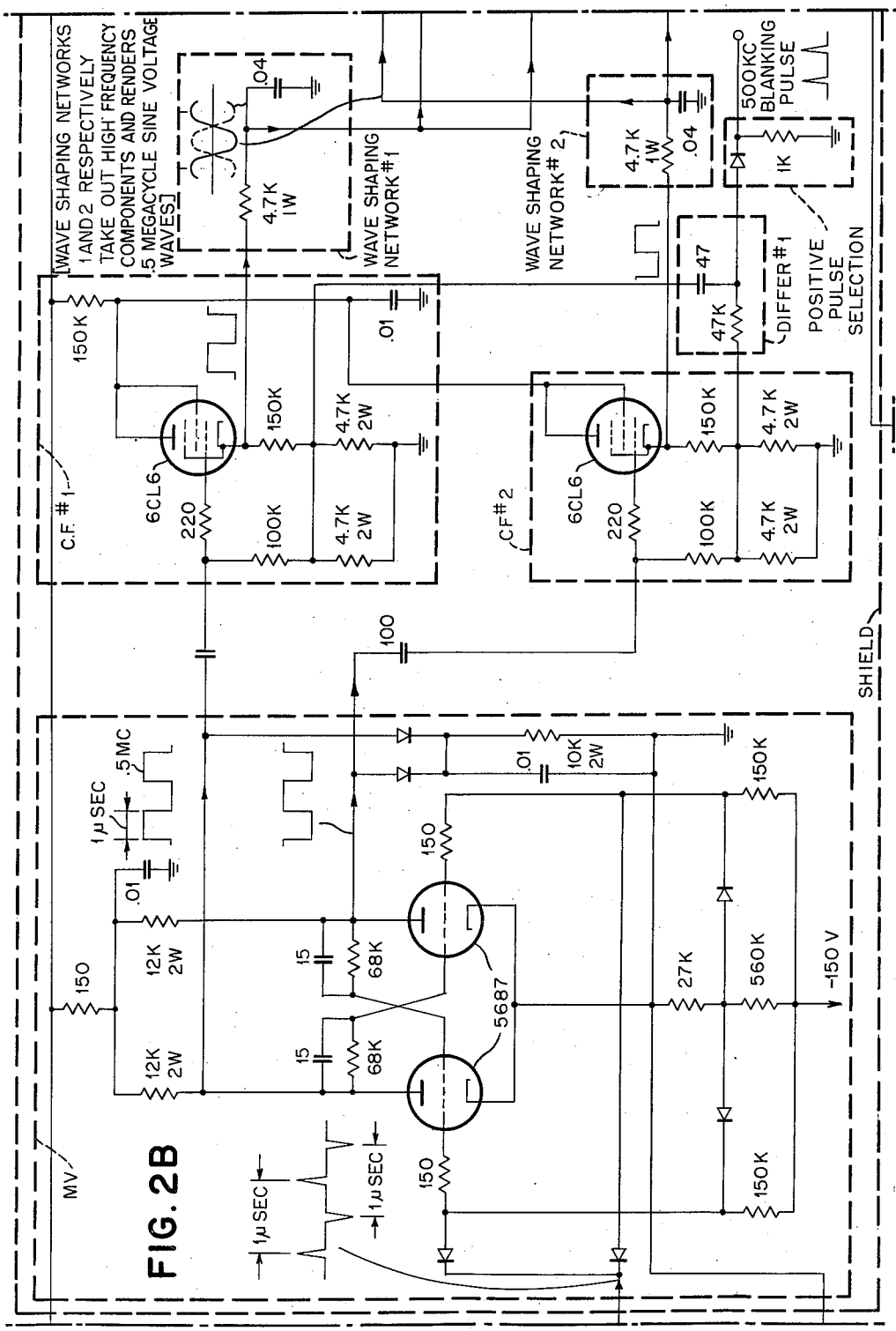

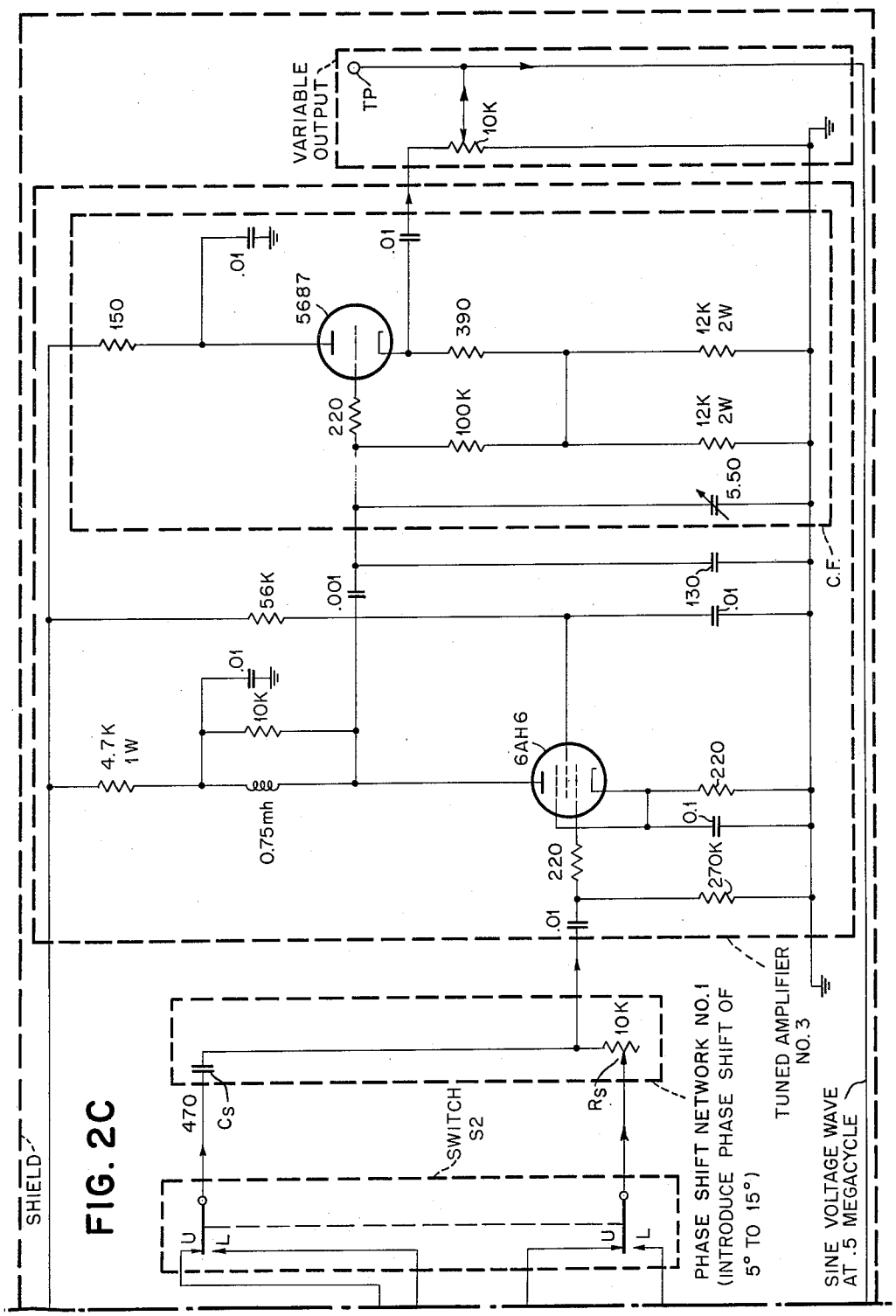

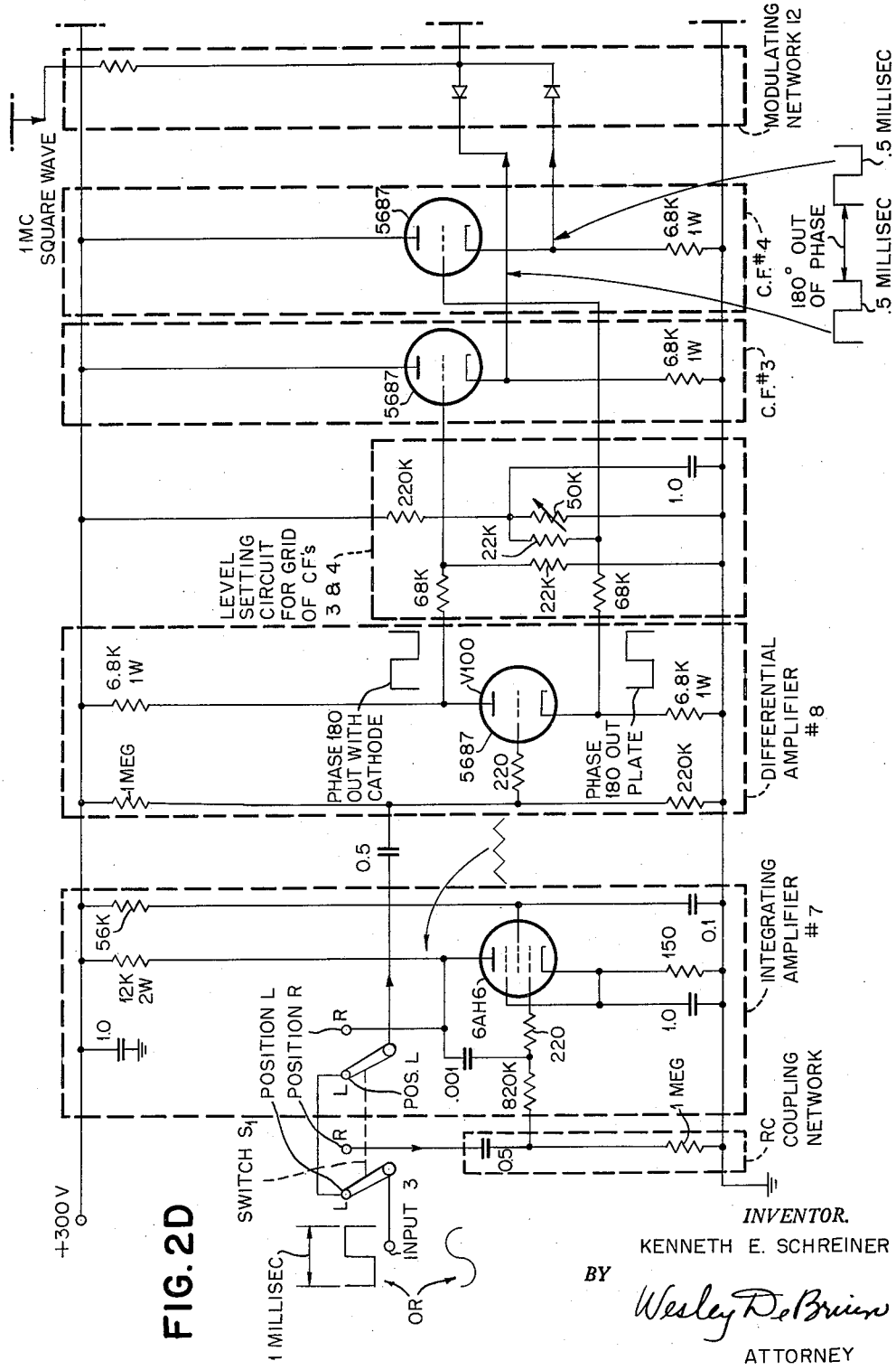

Sept. 19, 1961   K. E. SCHREINER   3,000,564
ELECTRONIC APPARATUS
Filed July 15, 1957   14 Sheets-Sheet 10
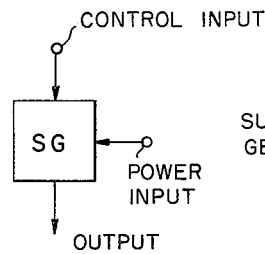
FIG. 4
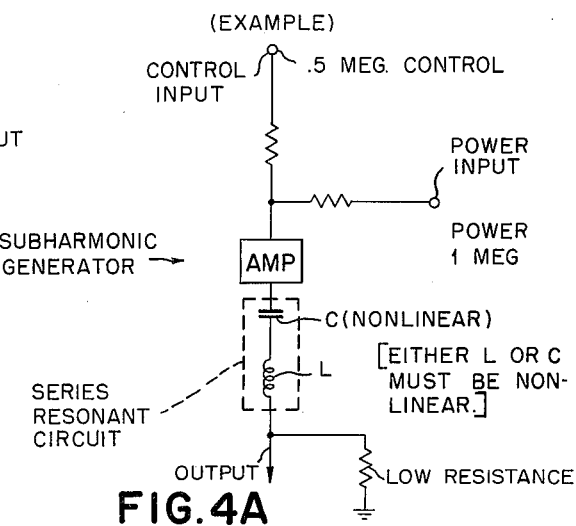
FIG. 4A
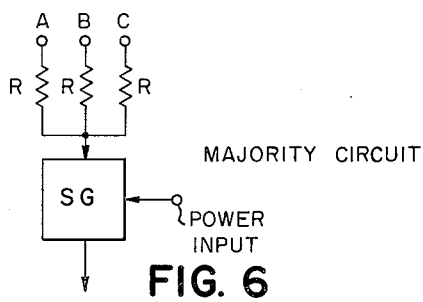
FIG. 5
FIG. 6
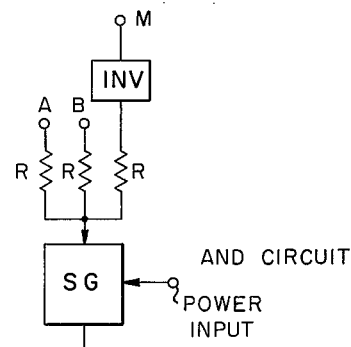
FIG. 8
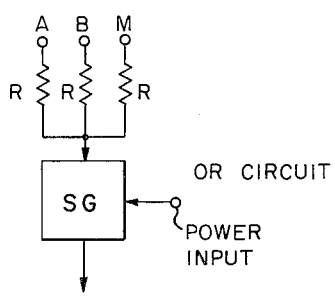
FIG. 7
INVENTOR
KENNETH E. SCHREINER
BY Wesley De Bruin
ATTORNEY

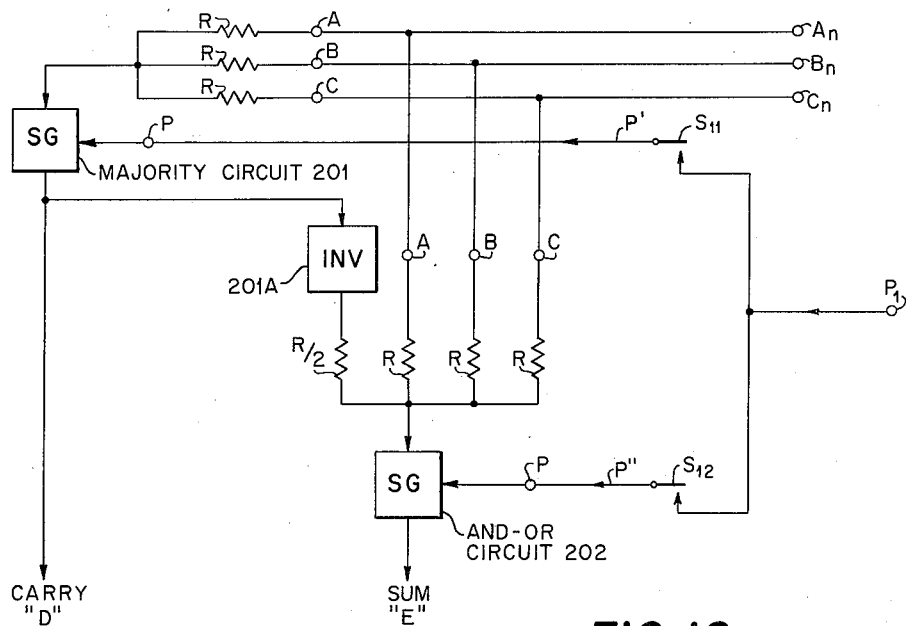
FIG. 10
BINARY ADDER
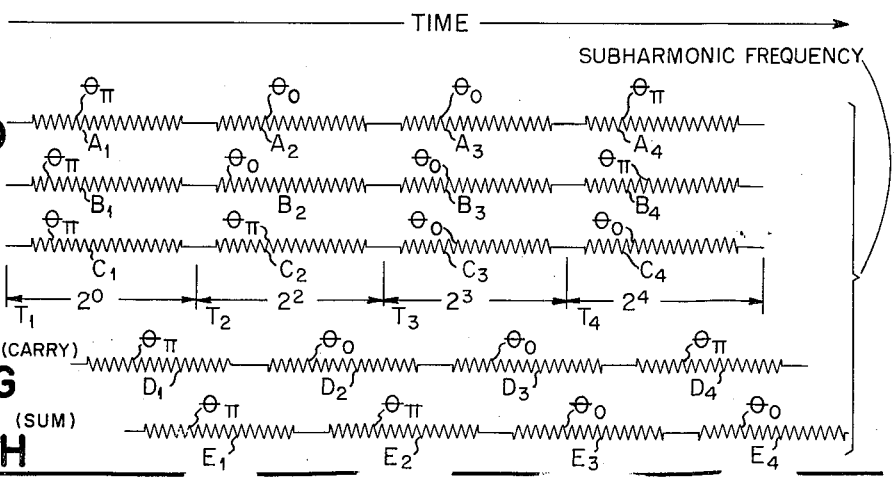

Sept. 19, 1961 K. E. SCHREINER 3,000,564
ELECTRONIC APPARATUS
Filed July 15, 1957 14 Sheets-Sheet 13

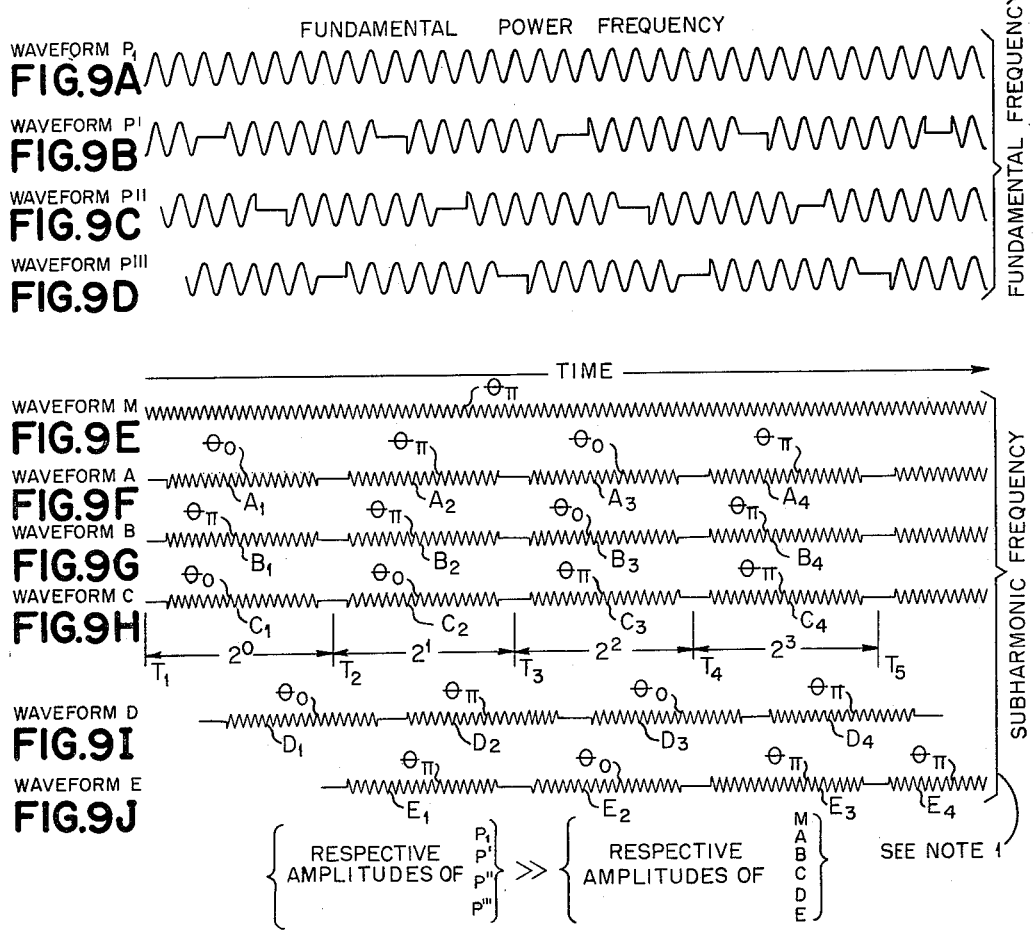

PHASE ANGLE OF SUBHARMONIC MAY BE EITHER $\theta_0$ OR $\theta_\pi$ EXCEPT FOR M, WHOSE PHASE IS $\theta_\pi$.
PHASE ANGLES OF $D_1$ & $E_1$ DEPEND UPON PHASES OF $A_1, B_1,$ & $C_1$,
PHASE ANGLES OF $D_2$ & $E_2$ DEPEND UPON PHASES OF $A_2, B_2,$ & $C_2$, ETC.

CHART ILLUSTRATES TYPICAL EXAMPLES OF PHASES (0 OR π) FOR SIGNALS (A,B,C,D,E) WITH SAME SUBS.

FIG. 11

|   | 1 | 2 | 3 | 4 |
|---|---|---|---|---|
| A | 0 | π | 0 | π |
| B | π | π | 0 | π |
| C | 0 | 0 | π | π |
| D | 0 | π | 0 | π |
| E | π | 0 | π | π |

NOTE 1:
SUBHARMONIC FREQUENCIES RESPECTIVE HAVE TIME-PHASE RELATIONSHIP OF $\theta_0$ OR $\theta_\pi$ WITH RESPECT TO FUNDAMENTAL (POWER) FREQUENCY.

INVENTOR
KENNETH E. SCHREINER
BY Wesley DeBruin
ATTORNEY

Sept. 19, 1961     K. E. SCHREINER     3,000,564
ELECTRONIC APPARATUS
Filed July 15, 1957     14 Sheets—Sheet 14

TIME

INVENTOR
KENNETH E. SCHREINER
BY Wesley De Brien
ATTORNEY

United States Patent Office 3,000,564
Patented Sept. 19, 1961

3,000,564
ELECTRONIC APPARATUS
Kenneth E. Schreiner, Harrington Park, N.J., assignor to International Business Machines Corporation, New York, N.Y., a corporation of New York
Filed July 15, 1957, Ser. No. 671,862
2 Claims. (Cl. 235—176)

This invention relates to circuits for utilizing the non-linearity of a capacitor or inductance to obtain binary manifestations, and by combinations of such circuits, obtain logical devices for employment in digital computers and the like. From the detailed discussion of the invention that follows, it will be appreciated that the invention may be practiced in a number system having a base, or radix other than two, for example ternary, quaternary, quinary, etc. Reference is made to the U.S. patent application, Serial No. 426,149, of John Von Neumann, filed April 28, 1954, entitled "Non-Linear Capacitance or Inductance Switching, Amplifying and Memory Organs," granted as Patent No. 2,815,488 on December 3, 1957 and of common assignee herewith.

The basic element necessary to the practice of applicant's invention may be any electromagnetic device possessing both capacitance and inductance and therefore a resonant frequency for small oscillations about its state of equilibrium. Also, at least one of these two reactances must be non-linear. To excite this device there is provided a first amplitude modulated periodic electrical voltage wave (or power supply) capable of impressing on the device a potential at a certain first or basic frequency. There is also provided a second input (or control) signal at a second definite frequency. These two together will, under suitable conditions, elicit a particular type of response from this device because of its non-linear nature in its non-dissipative feature (namely, in its capacitance or in its inductance). This response consists of an output signal, which is then viewed in terms of its component in a certain third frequency that may have to be isolated by filtering. It should be noted that the second and the third frequency may coincide and that either or both of them may coincide with the first frequency or with zero. It is characteristic of this type of response that the complex amplitude of the output signal undergoes greater variations than the complex amplitude of the second input (or control) signal. This is amplification. It may occur concurrently with or subsequently to the presence of the second input (or control) signal—at any rate it will occur in a definite period of time, determined by the subsequent amplitude modulation pattern of the first amplitude modulated periodic electrical voltage wave, or power supply. It may, for a suitable first wave amplitude modulation pattern, last, in its amplified form, beyond the duration of the second input (or control) signal. In this case it exhibits memory and hysteresis. By various superposition arrangements affecting the first and second input signals, all logical and switching functions can be obtained. These arrangements, and including harmonic and subharmonic generation, will be discussed in detail hereinafter.

All these procedures, and in particular those in the cases of harmonic response and of subharmonic response, can be implemented by numerous electromagnetic devices, many of them being solid state devices.

Among the solid state devices, the crystal diode, which possesses a non-linear capacitance, deserves special mention. In addition to the usual advantages of solid state devices it exhibits especially high speed—probably several 100, and up to 1000 times faster than the corresponding use of conventional vacuum tubes. The aforementioned Von Neumann patent discloses, as one illustrative embodiment, an arrangement employing as the electromagnetic device a crystal diode having a non-linear capacitance.

Other solid state implementations are furnished by substances whose dielectric constant or magnetic permeability depend on the electromagnetic field, thus providing for non-linear capacitances or inductances. Ferroelectric and ferromagnetic substances are, in view of their saturation properties, examples of this.

Although the illustrative embodiments, set forth in detail hereinafter, employ as a power supply a one megacycle amplitude modulated sine voltage wave and a .5 megacycle sine voltage wave as a control input, it will readily be apparent that applicant's invention may be practiced by employing power and control inputs of much higher frequency, i.e., up to several 10,000 megacycles per second. These higher frequency embodiments of applicant's invention will employ coaxial cables, waveguides, cavity resonators, very high frequency tubes such as klystrons, traveling wave tubes, magnetrons, and the like, as circuit components.

The primary object of this invention is the provision of a novel bistable, or binary, device embodying applicant's invention. The novel bistable device having greater speed, reliability, and being simpler to construct and operate, than those of the prior art.

A second object of this invention is the provision of an amplifier, embodying applicant's invention, and being simple, reliable and stable in operation.

A further object of this invention is the provision of a novel memory unit, embodying applicant's invention, and being simple to construct and operate, and having greater speed and reliability than those of the prior art.

A still further object of this invention is the provision of a novel subharmonic generator embodying applicant's invention.

Still another object of this invention is the provision of novel MAJORITY logical circuitry embodying applicant's invention.

Still another object of this invention is the provision of novel OR, AND, and MAJORITY circuits embodying applicant's invention.

Yet another object of this invention is the provision of novel binary adders employing the novel OR, AND and MAJORITY circuits, or novel MAJORITY logical circuitry.

A still additional object is the attaining of any or all of the preceding objects in a number system having a base, or radix, other than two. For example, a number system having a base, or radix 3, 4, 5 or higher.

Other objects of the invention will be pointed out in the following description and claims and illustrated in the accompanying drawings, which disclose, by way of example, the principle of the invention and the best mode, which has been contemplated, of applying that principle.

The following description of an illustrative embodiment of applicant's invention makes references to the drawings as follows:

FIG. 1 discloses how FIGS. 1A and 1B are to be joined to disclose in detail an illustrative circuit for practicing applicant's invention. The embodiment shown in composite FIG. 1 may be employed as a bistable element, a subharmonic generator, an amplifier, or a memory element;

FIG. 1A discloses a portion of the circuit of composite FIG. 1;

FIG. 1B discloses a portion of the circuit of composite FIG. 1;

FIGS. 1D and 1E, joined as shown in FIG. 1C, disclose the time-phase relationship of idealized voltage waveforms representative of a power input, a control input of Phase 1, a subharmonic output of Phase 1, a control input of Phase 2 and a subharmonic output of Phase 2.

Figure 2A:
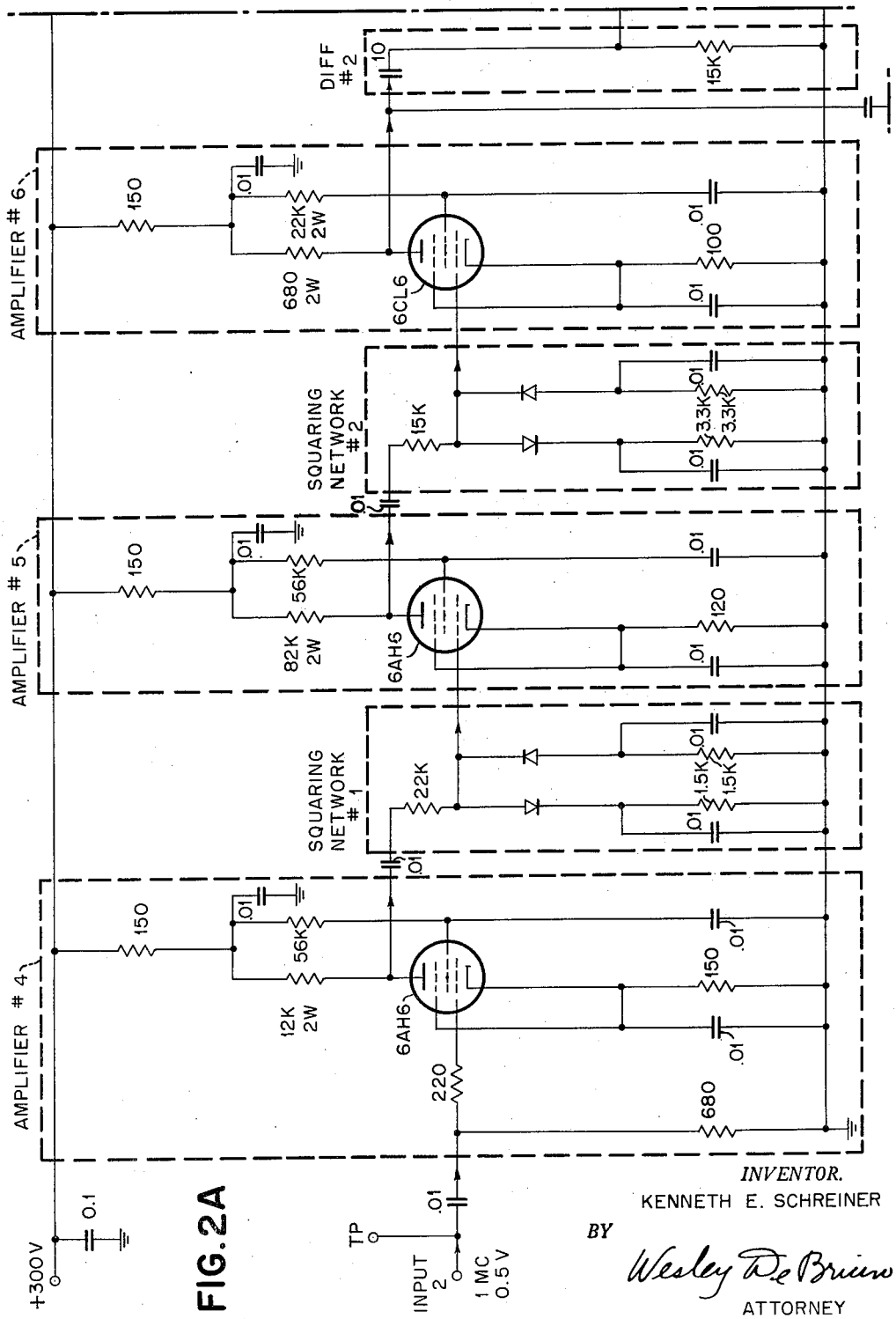
Figure 2E:
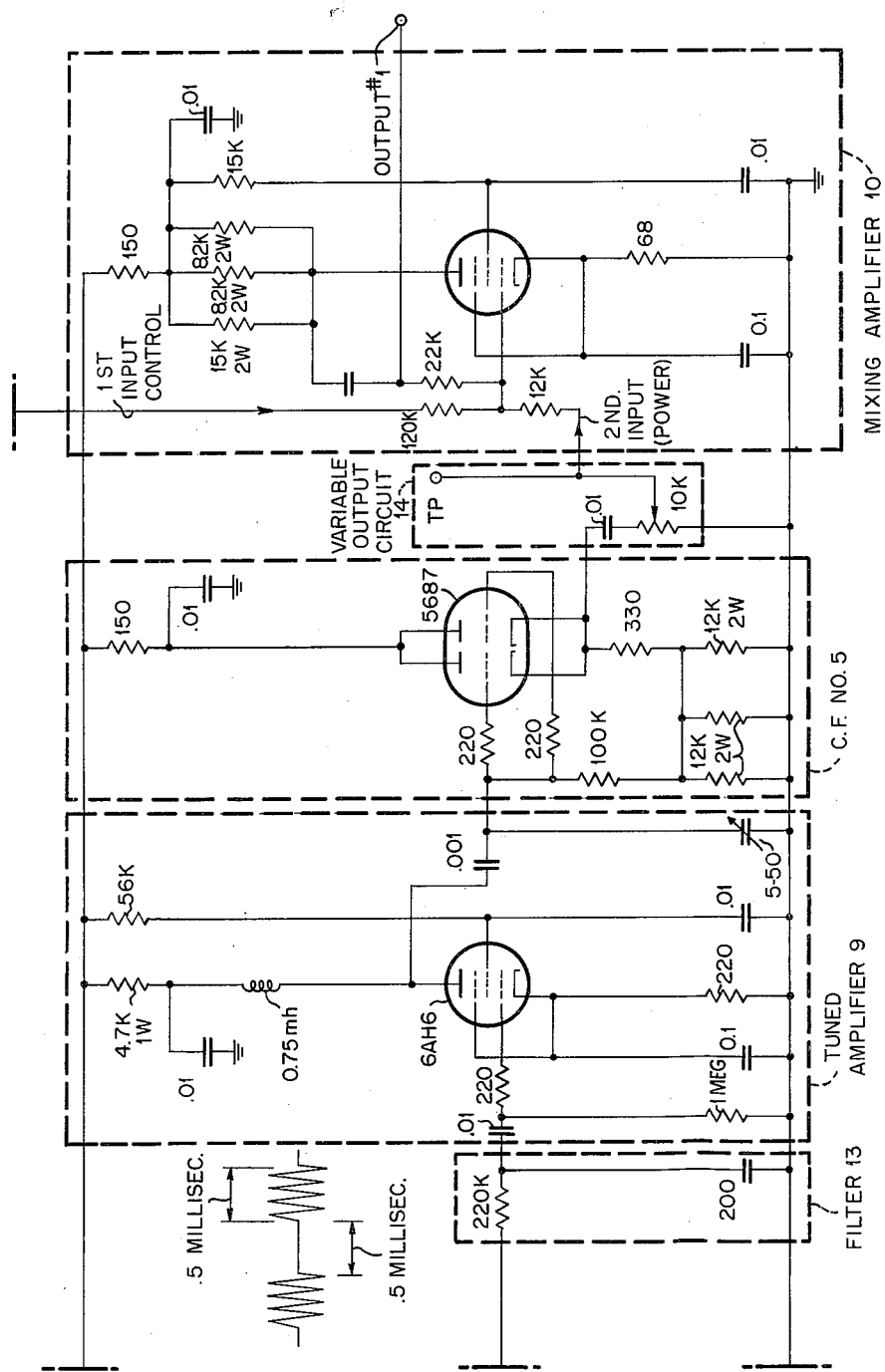
Figure 9:
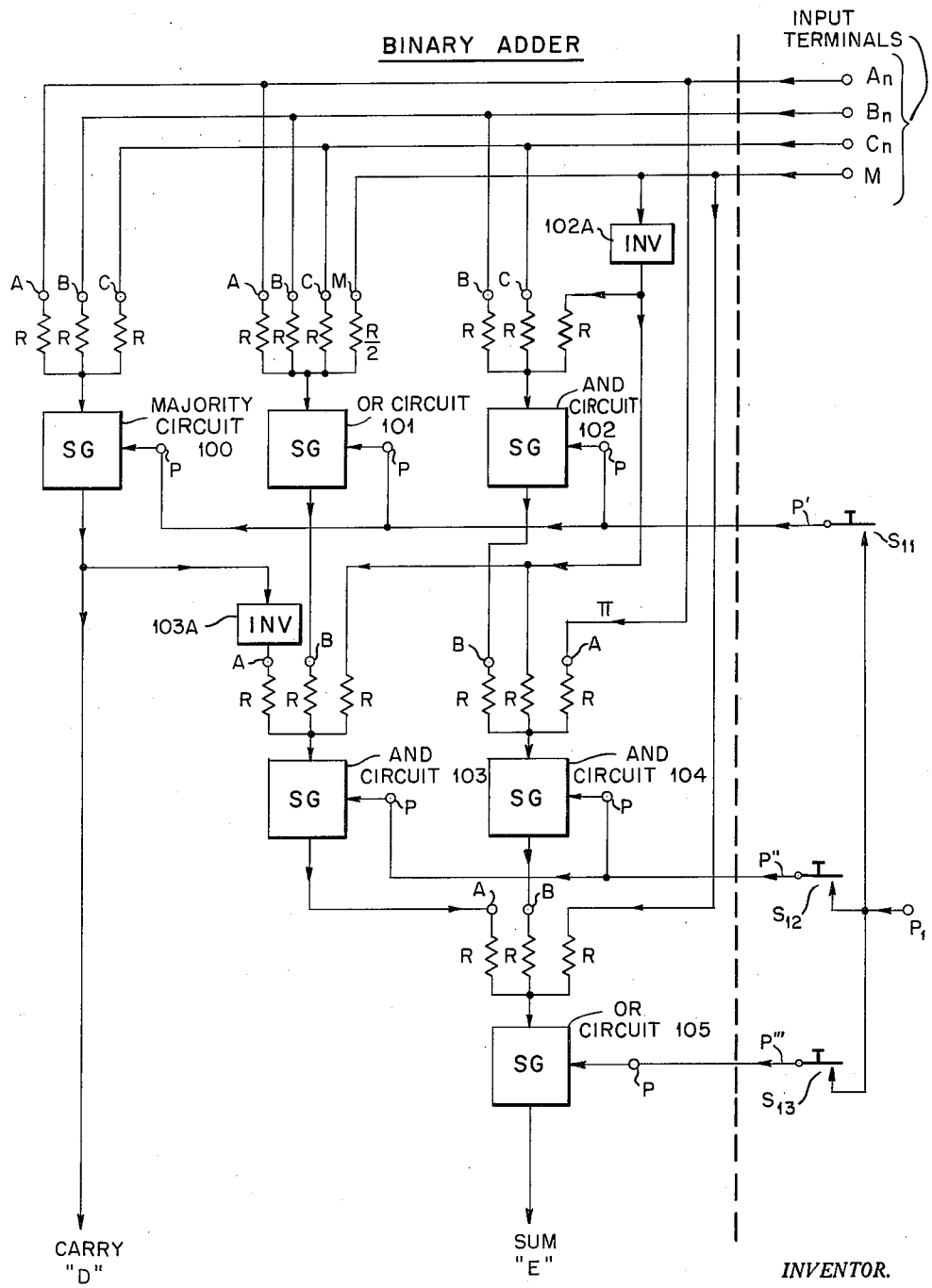
Figure 12:
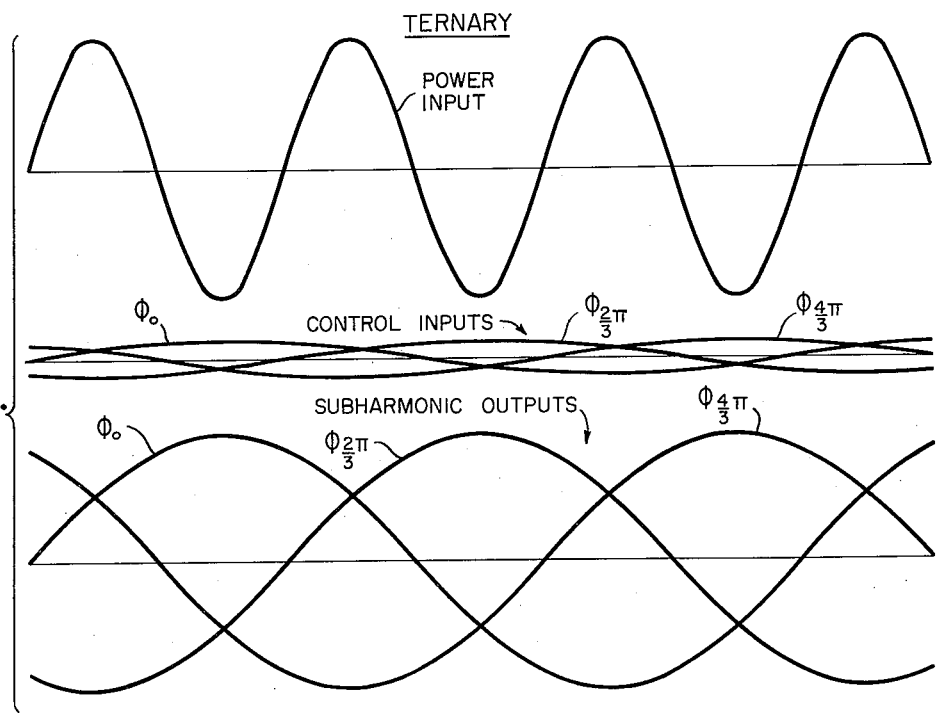
Figure 1F:
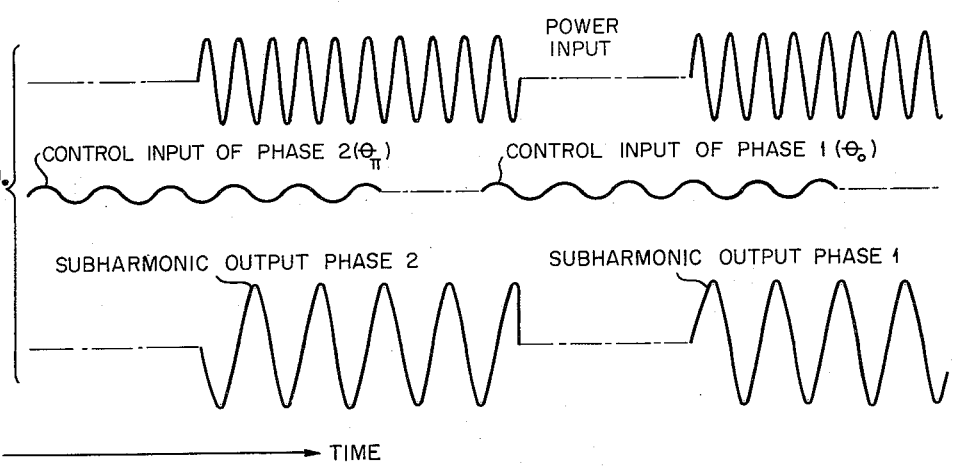

The waveforms of FIG. 1C are referred in the specification with reference to the circuitry of FIGS. 1, 2, 4, 6, 7, 8, 9 and 10;

FIG. 1F discloses waveforms similar to those of FIGS. 1D and 1E, but reduced in scale and illustrating on an abbreviated time base the relation of the power input and control inputs to the subharmonic outputs;

FIG. 2 discloses how FIGS. 2A through 2E are to be joined to disclose a circuit for combining a one megacycle sine voltage wave input with a one kilocycle square (or sine) voltage wave input to obtain as an output, a single time variant voltage wave having as components thereof a one megacycle sine voltage wave amplitude modulated with a one kilocycle square voltage wave and a .5 megacycle sine voltage wave, and having a predetermined phase displacement between said one megacycle voltage wave and said .5 megacycle voltage wave;

FIG. 2A discloses a portion of the circuit of composite FIG. 2;

FIG. 2B discloses a portion of the circuit of composite FIG. 2;

FIG. 2C discloses a portion of the circuit of composite FIG. 2;

FIG. 2D discloses a portion of the circuit of composite FIG. 2;

FIG. 2E discloses a portion of the circuit of composite FIG. 2;

FIG. 3 illustrates graphically the non-linear characteristic of the capacitor of the series tuned resonant circuit shown in FIG. 1B, i.e., the variation in capacitance C, with respect to the potential impressed on said capacitor C. The capacitor C may be a ceramic capacitor composed of barium titanate, or other suitable substance, having dielectric properties which vary with applied voltage;

FIG. 4 discloses a block representation of a device for practicing applicant's invention. This device possesses the following characteristics: (1) binary manifestations, (2) amplification, and (3) memory or hysteresis;

FIG. 4A discloses an alternative representation of the device of FIG. 4, for practicing applicant's invention;

FIG. 5 discloses a block representation of an inverter circuit;

FIG. 6 discloses an embodiment, employing applicant's invention, in the form of a MAJORITY circuit, or MAJORITY logical arrangement;

FIG. 7 discloses an embodiment, employing applicant's invention, in the form of an OR circuit;

FIG. 8 discloses an embodiment, employing applicant's invention, in the form of an AND circuit;

FIG. 9 discloses an embodiment, employing applicant's invention, in the form of a binary adder;

FIGS. 9A through 9J, respectively, disclose voltage waveforms to be viewed in conjunction with the explanation, and example of operation, of the binary adder of FIG. 9;

FIG. 10 discloses a second embodiment employing applicant's invention, in the form of a binary adder;

FIGS. 10A through 10H, respectively, disclose voltage waveforms to be viewed in conjunction with the explanation, and example of operation, of the binary adder of FIG. 10;

FIG. 11 discloses a chart illustrating the example of operation of the binary adder of FIG. 9;

FIG. 12 discloses as employed and occurring in a ternary system, the time-phase relationship of idealized voltage waveforms representative of: a power input, a control input of phase $\phi_0$, a subharmonic output of phase $\phi_9$; a power input, a control input of phase $$\phi_{\frac{2\pi}{3}}$$

a subharmonic output of phase $$\phi_{\frac{2\pi}{3}}$$

and a power input, a control input of phase $$\phi_{\frac{4\pi}{3}}$$

and a subharmonic output of phase $$\phi_{\frac{4\pi}{3}}$$

and

Figure 12A:
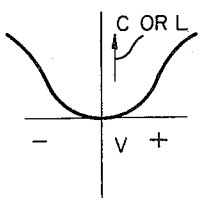
Figure 12B:
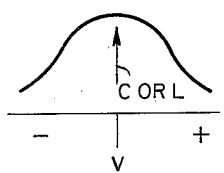

FIGS. 12A and 12B, respectively, illustrate graphically, in general form, the non-linear characteristic of a capacitor or inductor that may be employed in practicing applicant's invention in a ternary system. It will be appreciated that the non-linear characteristic of the inductance or capacitance employed to practice applicant's invention is not limited to the illustrative graphs of FIGS. 3, 12A and 12B.

Reference is made to FIG. 2. Input 2 (FIG. 2A) has impressed thereon, as an input, a one megacycle sine voltage wave having a peak voltage magnitude of approximately .5 volts. This input is impressed via amplifier 4 (FIG. 2A), squaring network No. 1 (FIG. 2A), amplifier 5 (FIG. 2A), and squaring network No. 2 (FIG. 2A) on the input of amplifier No. 6 (FIG. 2A). The output of amplifier No. 6 (FIG. 2A) is a substantially square voltage wave at a frequency of one megacycle. This square wave output of amplifier No. 6 is impressed on the input of differentiating circuit No. 2 (FIG. 2A) and on an input of modulating network No. 12 (FIG. 2B). The output of differentiating network No. 2 (FIG. 2A) is a series of positive and negative pulses that are, respectively, displaced in time by one microsecond. The negative pulses (FIG. 2B), that are displaced in time by one microsecond, are effective in driving the multivibrator MV (FIG. 2B) which renders a square voltage wave output at a frequency of .5 megacycles (i.e., one microsecond duration positive pulses displaced in time by one microsecond). It will be noted from FIG. 2B that two outputs, displaced in phase by 180°, are taken from the multivibrator, MV, and respectively impressed on the grids of cathode followers No. 1 (FIG. 2B) and No. 2 (FIG. 2B). Associated with each of these cathode followers is a wave shaping network (wave shaping networks No. 1 and No. 2, FIG. 2B) that eliminates, or filters out, the high frequency components of the one megacycle square voltage wave to render substantially a sine voltage wave output at a frequency of .5 megacycles. The voltages emerging from the wave-shaping networks, therefore, are effectively push-pull sine-wave voltages. A switch $S_2$ (FIG. 2C) is connected so as to permit the push-pull voltages of either one phase or the opposite phase to be impressed upon the two input terminals of phase-shift network No. 1 (FIG. 2C). It is a characteristic of this type of phase-shift network, that the output voltage can be made to vary in phase by almost 180° without significant changes in amplitude when the variable resistance $R_s$ is varied through its range. The output of phase-shift network No. 1 is impressed on the input of tuned amplifier No. 3 (FIG. 2C) from which a variable voltage output, i.e., magnitude, at a frequency of .5 megacycles and having a sine wave shape is obtained. The sine voltage wave output from tuned amplifier No. 3 (FIG. 2C) is impressed on the first input of mixing amplifier No. 10 (FIG. 2E).

Reference is made to FIG. 2D. Input No. 3 (FIG. 2D) may have impressed thereon a one kilocycle square wave voltage wave. It is to be appreciated that the one kilocycle frequency is merely an example of a frequency that may be employed. The actual frequency may be 100 cycles per second to 50 kilocycles, for example. Assume switch $S_1$ is in its "position R" and a one kilocycle square voltage wave is impressed on Input No. 3 (FIG. 2D). This one kilocycle square voltage wave is impressed via an RC coupling network (FIG. 2D) on the input of integrating amplifier No. 7 (FIG. 2D). The output of integrating amplifier No. 7 is a triangular shaped voltage wave having a repetition rate of one kilocycle. This triangular shaped voltage waveform is impressed on the input of a differential amplifier No. 8 (FIG. 2D) employing a triode V100. The output from the plate of triode V100 is a triangular voltage wave which is approximately 180° out of phase with respect to the triangular voltage wave output taken from the cathode of triode V100. It will now be apparent, from FIG. 2D, that with switch $S_1$ in its "Position L," and a one kilocycle square voltage wave impressed on input No. 3 (FIG. 2D) that the outputs of differential amplifier No. 8 will be one kilocycle square voltage waves approximately 180° out of phase with respect to each other. In the following discussion, the square wave is used rather than the triangular wave. The phase displaced square voltage wave outputs from the plate and cathode of triode V100 are, respectively, applied through a level setting circuit (FIG. 2D) to the grids of cathode followers No. 3 and No. 4 (FIG. 2D). The outputs of cathode followers No. 3 and No. 4 are, respectively, square voltage waves having successive positive portions of a duration of .5 millisecond; that is, the pulse repetition rate is approximately one kilocycle. It will be appreciated, however, that the output of cathode follower No. 3 is 180° out of phase with respect to the output of cathode follower No. 4.

The one megacycle square voltage wave output of amplifier No. 6 (FIG. 2A) and the phase displaced one kilocycle square voltage wave outputs of cathode followers No. 3 and No. 4 are combined in modulating network 12 (FIG. 2D) to obtain an amplitude modulated output voltage wave. This amplitude modulated output has an envelope, as roughly shown in FIG. 2E, which includes periodic portions of variating amplitude every .5 of a millisecond. The output of modulating network 12 is impressed via filter 13 (FIG. 2E), and tuned amplifier No. 9 (FIG. 2E) on the input of cathode follower No. 5 (FIG. 2E). The output of cathode follower No. 5 is a one megacycle sine voltage wave that has been amplitude modulated with a one kilocycle square voltage wave. Variable output circuit 14 (FIG. 2E) is connected between the output of cathode follower No. 5 (FIG. 2E) and the second input of mixing amplifier No. 10 (FIG. 2E).

As will be recalled, the first input of mixing amplifier 10 (FIG. 2E) has impressed thereon a .5 megacycle sine voltage wave, whereas the second input thereof, has impressed thereon a one megacycle sine voltage wave that has been amplitude modulated with a one kilocycle square voltage wave. The output of mixing amplifier 10, appearing at output No. 1 (FIG. 2E) is a periodic voltage wave having the following components: a one megacycle sine voltage wave amplitude modulated with a one kilocycle square voltage wave, and a .5 megacycle sine voltage wave. This periodic voltage wave, appearing at output No. 1 of FIG. 2E, is impressed on input No. 1 of FIG. 1A.

As seen from FIG. 2C, switch $S_2$ has two positions, the first position (U) of said switch effects the selection of push-pull voltage waves of one phase, generally of sine wave form, at a frequency of approximately .5 megacycle. The second position (L) of switch $S_2$ effects the selection of push-pull voltage waves, also generally of sine wave form, and at a frequency of approximately .5 megacycle, but displaced in phase with respect to the voltage waves selected by said switch when in the first position by a phase angle of 180°. Phase shift network No. 1 includes capacitor $C_s$ (FIG. 2C) and the resistor $R_s$ (FIG. 2C) and is connected to switch $S_2$ as shown in FIG. 2C. This network is effective in providing a variable phase shift of the voltage wave selected by said switch. The phase shift effected by the phase shift network No. 1 (FIG. 2C) approaches 180 degrees.

Reference is made to FIG. 1. FIG. 1 includes amplifier No. 1 (FIG. 1A), a feedback amplifier No. 2 (FIG. 1A), a D.C. bias circuit (FIG. 1B) for the non-linear capacitor C (FIG. 1B), inductance L (FIG. 1B) and a switching arrangement (FIG. 1B) including switch $S_3$ for feeding a signal to an oscilloscope (FIG. 1B). Output 1 (FIG. 2E) is coupled by a suitable coaxial cable to input 1 (FIG. 1A). Thus impressed via input 1 (FIG. 1A) on the input of amplifier No. 1 (FIG. 1A) is the periodic voltage wave having the following components: a one megacycle sine voltage wave amplitude modulated with a one kilocycle square voltage wave and also a .5 megacycle sine voltage wave having a peak amplitude of the order of 0.1% of the peak amplitude of the one megacycle amplitude modulated voltage wave. The primary function of amplifier No. 1 (FIG. 1A) and feedback amplifier No. 2 (FIG. 1A) is to generate an electrical voltage wave having a peak amplitude of approximately 150 volts maximum. The output impedance of feedback amplifier No. 2 is of the order of 2 ohms. The output of feedback amplifier No. 2 is impressed on the non-linear capacitor C of the non-linear network (FIG. 1B). The non-linear capacitor C is connected in series with an inductance L and this series circuit is tuned to resonate at 500 kilocycles for small oscillations. It is preferable to obtain a substantially fixed value of L and then to employ a D.C. biasing circuit to obtain the value of C. Reference is made to the D.C. biasing circuit shown in FIG. 1B and to the plot of D.C. volts impressed on capacitor C versus the capacitance of capacitor C, as shown in FIG. 3.

Referring to FIG. 1B, it is seen that a legend states that a 40 volt peak, or greater, of the envelope of the voltage wave impressed across the L-C series circuit is necessary for applicant's device to function properly. For this reason, the one megacycle sine voltage wave was amplitude modulated with a one kilocycle square voltage wave. The nature of the tuned L-C circuit is such that an output (subharmonic) sine voltage wave at a frequency of .5 megacycle is generated only when the envelope of the (fundamental) one megacycle sine voltage wave, amplitude modulated with a one kilocycle square voltage wave, has periodic peak amplitudes that exceed a given critical voltage. The magnitude of this critical voltage depends upon the value of the parameters L and C, as well as the nature of the non-linearity of the capacitor C, and upon the losses in the L-C circuit. The .5 megacycle sine voltage wave which is also impressed on input 1 (FIG. 1A) is intended to establish the desired phase of the output (subharmonic) sine voltage wave at a frequency of .5 megacycles in the L-C circuit (FIG. 1B). The subharmonic, i.e., output sine voltage wave at a frequency of .5 megacycles, generated may have either one of two time-phase relations with respect to the time-phase of the fundamental or power voltage wave. The phase of the subharmonic actually developed depends upon the time-phase relationship of the small control (or stimulating) .5 megacycle sine voltage wave input with respect to the time-phase of the power (or fundamental) voltage wave input. The control and power voltage wave inputs are respectively applied to input 1 (FIG. 1A), whereas the output subharmonic voltage wave will appear across the non-linear capacitor C (FIG. 1B). If the voltage across the non-linear network (FIG. 1B) i.e., series circuit consisting of non-linear capacitor C and inductance L, is greater than 40 peak volts in magnitude, changing the phase of the .5 megacycle control input has no effect on the phase of the subharmonic output. Therefore, the fundamental or power input is an amplitude modulated one megacycle voltage wave. The power input is amplitude modulated in such a manner that the .5 megacycle control input can reverse its phase during successive time-displaced time periods when the envelope of the one megacycle amplitude modulated power input has an amplitude of less than 40 volts. All of the considerations of the time-phase relationship of the power input, the control input, and the subharmonic output will appear more clearly from a detailed discussion of idealized power, control, and output waveforms, hereinafter.

The switching arrangement of FIG. 1B employs switch $S_3$ which has four positions numbered 1, 2, 3 and 4. The four positions of switch $S_3$, respectively accomplish the following: position 1 is effective in conveying to the oscilloscope (FIG. 1B) a voltage signal or waveform indicative of the driving voltage, i.e., the output of feedback amplifier No. 2 (FIG. 1A); position 2 is effective in conveying a signal to the oscilloscope that is indicative of the current through the L-C circuit; position 3 accomplishes substantially the same function as position 1; and, position 4 obtains a signal that is indicative of the charge variation of the L-C circuit and conveys this signal to the oscilloscope.

It can be shown, either experimentally or theoretically, that in the practice of applicant's invention there is an optimum phase displacement between the one megacycle sine voltage wave that is amplitude modulated with a one kilocycle square voltage wave input, and the .5 megacycle sine voltage wave input. The one megacycle input will be referred to as the power input. The .5 megacycle input will be referred to as the control input. The .5 megacycle sine voltage wave output will be referred to as the subharmonic output. Further, the novel device for practicing applicant's invention, may be referred to as a subharmonic generator, a binary element, a memory device, or a logical device. This device will exhibit memory in that once the desired subharmonic output is established, and the power input is not interrupted and remains in magnitude above the critical level, the subharmonic output of the device will remain unchanged regardless of variations in phase of the control input.

Reference is made to the typical voltage waveforms of the power input, the control inputs, and the subharmonic outputs as shown in FIGS. 1D and 1E. The phase displacement angle X between the power input and the control input of phase 1 and between the power input and the control input of phase 2 can be arrived at experimentally, or theoretically generally along the line of approach set forth in McLachlan's text on "Ordinary Non-Linear Differential Equations," Oxford, 1950. It is to be noted from FIGS. 1D and 1E that the phase angle between the control input of phase 1 and the control input of phase 2 is 180° or $\pi$ radians.

*Operation of the illustrative embodiment of FIGS. 1 and 2*

Referring to FIGS. 2C and 2E, it will be seen that with switch $S_2$ in its upper position, a control input of phase 1, generally having the idealized form shown in FIG. 1D, is impressed on the first input (control) of mixing amplifier 10 of FIG. 2E. The second input (power) of mixing amplifier 10 has impressed thereon a power input, generally of the idealized form shown in FIG. 1D. Under these conditions, the output across the non-linear capacitor C of FIG. 1B will have a subharmonic component having an amplitude considerably greater than that of the control input. The power input, control input of phase 1, and subharmonic output across the non-linear capacitor C of FIG. 1B, are shown in idealized form in FIG. 1C. It is to be appreciated that the amplitude of the envelope of the power input may be considerably greater, i.e., a multiple in the order of 1000, than the amplitude of the control input. Also, the amplitude of the subharmonic output is considerably greater than that of the control input. Also, the amplitude of the subharmonic output across C is considerably greater than the voltage across C produced by the control input alone, in the absence of the power input. This characteristic of the device is its amplification feature. Still referring to FIGS. 1D and 1E, it will be seen that subsequent to the application of the power input and control input for a finite period of time, the control input may be removed (and/or reversed in phase) and the subharmonic output appearing across the non-linear capacitor C of FIG. 1B will remain. This feature of applicant's device illustrates its memory characteristic. (Reference is made to FIG. 1F).

Now assume that switch $S_2$ of FIG. 2C is in its lower position. Then impressed on input 1 (control) of mixing amplifier 10 will be a control input of phase 2. A control input of phase 2 is shown in idealized form in FIG. 1D. With a control input of phase 2 impressed on input 1 of mixing amplifier 10 and a power input impressed on input 2 of said amplifier, the output obtained across non-linear capacitor C of FIG. 1B will have a subharmonic frequency component generally of the idealized form labelled "Subharmonic Output of Phase 2" in FIG. 1D. With a power input and control input of phase 2, applicant's device will have an amplifying characteristic, as described above with respect to a control input of phase 1. Correspondingly, with the control input of phase 2 removed, sugsequent to the application of a power input and control input of phase 2, applicant's device will exhibit a memory characteristic.

The bistable or binary characteristics of applicant's device will now be explained. Let it be assumed that switch $S_2$ of FIG. 2C is in its upper position $(u)$ and hence a control input of phase 1 is impressed on input 1 of mixing amplifier 10. Assume also that a power input is impressed on input 2 of mixing amplifier 10. Then a subharmonic output of phase 1 will appear across non-linear capacitor C of FIG. 1B. Now it will be recalled that if the control input of phase 1 is subsequently removed, the subharmonic output of phase 1 will continue, so long as the magnitude of the power input remains above the critical voltage level. Let it be assumed that switch $S_2$ of FIG. 2C is now placed in its lower position (L). Then impressed on input 2 of mixing amplifier 10 will be a control input of phase 2. The impressing of a control input of phase 2 on applicant's device will result in the output across the non-linear capacitor C of FIG. 1B having a subharmonic output of phase 2, as viewed in FIG. 1D, provided the power input is increased from less than critical to greater than critical voltage after the application of the control input of phase 2. Further, the subsequent removal of the control input of phase 2 will have no effect on this output provided the magnitude of the power input remains above the critical level. However, if switch $S_2$ (FIG. 2C) is returned to its upper position $(u)$ and a control input of phase 1 is thereby impressed on applicant's device, then the output across the non-linear capacitor C will have as a component a subharmonic output of phase 1, provided the power input is increased from less than critical to greater than critical voltage after the control input becomes phase 1. This sequence of operation can be carried on indefinitely in any order. It will now be apparent that applicant's device possesses a bistable or binary characteristic and can be employed in logical devices, such as those found in both analog and digital computers. The explanation presented herein assumes that the control input is very small in magnitude as compared to the power input. However, it is to be appreciated that it is possible, by increasing the magnitude of the control input, to over-ride a subharmonic of the opposite phase.

*Discussion of waveform of FIG. 1F*

Referring to the waveforms of FIG. 1F, it will be seen from the time scale, that prior to the application of the power input, a control input of phase 2 $(\theta\pi)$ is impressed on applicant's novel bistable device. Then, upon the impressing of the power input on said device, a subharmonic output of phase 2 will be generated. Further, from FIG. 1F it will be seen that when the control input is removed and subsequently a control input of phase 1 $(\theta_0)$ is impressed, but without the power input being interrupted or falling below the critical level in magnitude, the subharmonic output will remain unchanged, i.e., of phase 2. Upon the power input being interrupted or falling below its critical level in magnitude, as illustrated in FIG. 1F, a subharmonic output will not be generated. Subsequently, as shown in FIG. 1F, when the power input is re-established, and a control input of phase 1 $(\theta_0)$ having prior to this re-establishment of the power input been impressed on the novel bistable device, a subharmonic output of phase 1 will be generated. Further, this subharmonic output of phase 1, once established, regardless of variations in the phase of the control input, will continue so long as the power input is not interrupted and remains in magnitude above its critical level. These features of the invention have been brought out earlier herein, but are repeated for purposes of more fully explaining the operation of applicant's novel bistable device. The memory and amplification characteristics of applicant's novel bistable device will also be apparent from the curves of FIG. 1F.

Further, it will be appreciated that due to space limitations, the phase relationship of only a few cycles of the power input, control input and subharmonic output, are shown in FIG. 1F, and that the sequence of operation illustrated in FIG. 1F is merely by way of example. Actually, the device could initially have impressed on it a control input of phase 1 ($\theta_0$) and then upon the application of a power input, a subharmonic output of phase 1 would be generated, and continue to be generated, regardless of variations in the control input, until the power input was interrupted or fell below its critical magnitude level.

It will be apparent to those skilled in the art that many variations of amplitude modulation of the control input and/or the power input may be utilized in practicing applicant's invention.

*Binary device or subharmonic generator as represented in FIGS. 4 and 4A*

Referring to FIG. 4A, it will be seen that the control input and power input are respectively applied through a resistor to the input of an amplifier. The output of this amplifier is impressed on the input of a series resonant circuit including an inductance L and a non-linear capacitor C. An output is taken from one end of the inductance L. This end of the inductance L is connected via a suitable resistor to ground. Merely for purposes of explanation, the amplifier represented by a block in the embodiment of FIG. 4A may be thought of as comprising the mixing amplifier 10 (FIG. 2E), amplifier No. 1 (FIG. 1A) and feedback amplifier No. 2 (FIG. 1A). It will then be seen that the resistors in the power input lead and the control input lead of the representation of FIG. 4A correspond to the resistors in the first and second inputs of mixing amplifier 10 of FIG. 2E. Further, the non-linear capacitor C and the inductance L of FIG. 4A may be thought of as corresponding to the non-linear capacitor C and inductance L of the series resonant circuit of FIG. 1B. The resistor shown in FIG. 4A that is connected between one end of inductance L and ground may be thought of as corresponding to the resistor connected between contact No. 1 of switch $S_3$ and ground as shown in FIG. 1B. The D.C. biasing circuit of FIG. 1B may be thought of as being included in the amplifier represented by a block in FIG. 4A.

Applicant has disclosed an operative embodiment of his invention, but is aware of the fact that the invention may be practiced with a wide variety of components. That is, the amplifier represented by the block in FIG. 4A could be any one of a variety of types having suitable characteristics and specifically a low output impedance. Further, the non-linear capacitor C and inductance L, comprising a series resonant circuit, could be any one of a variety of types, specifically including a series resonant circuit in which the inductance L has a non-linear characteristic. It will be appreciated by those skilled in the art, that the resistor connected between the output of the series resonant circuit of FIG. 4A and ground could be replaced by a capacitor having a large capacitance compared to that of the non-linear capacitor C. This has two advantages, namely: first, the dissipation of the series tuned circuit is reduced, and secondly, the ratio of subharmonic voltage to fundamental voltage is increased by virtue of the difference in impedance of C to currents at the two frequencies. However, in the embodiments described herein, it is apparent that I desire the subharmonic output phase to be the same as that of the control phase and, hence, an additional 90° phase shift would have to be added somewhere in the circuit.

Thus it will be apparent that the circuitry of FIGS. 2A through 2E is actually auxiliary apparatus disclosed in conjunction with applicant's illustrative embodiment of his novel device for showing how a suitable power input and first and second discrete control inputs can be obtained and controlled for practicing applicant's invention. It will be appreciated by those skilled in the art, that applicant's contribution is in no way limited to the particular frequencies or circuit arrangements shown herein.

It will be convenient hereinafter to employ a block symbol such as that shown in FIG. 4 for applicant's novel device as represented in FIG. 4A. Thus it will be apparent that when a suitable power input is impressed on the power input terminal of the device of FIG. 4, in conjunction with a control input impressed on the control input terminal of the device of FIG. 4, that an output will appear at the output terminal of said device. Further, that this output will be determined by the most recently applied control input provided the magnitude of the power input is increased from less than critical to greater than critical voltage subsequent to the application of the most recent control input.

Hereinafter, it will be convenient to refer to a control input, having the time phase relationship to a power input corresponding to that of the control input of phase 1 shown in FIG. 1D, as a $\theta_0$ input. Correspondingly, a control input having the time phase relationship generally that of the control input of phase 2 with respect to the power input of FIG. 1D, will be referred to as a $\theta_\pi$ input. The $\theta_0$ and $\theta_\pi$ inputs will be representative of intelligence, for example, the binary digit "0" and the binary digit "1," respectively. The power input employed in the discussion that follows, will be an amplitude modulated periodic voltage wave similar in time phase relationship to the control inputs shown in FIG. 1D. A further input, referred to hereinafter as an M input, will be employed in the discussion that follows. This M input will have a time phase relationship with respect to the power input, identical to that of a $\theta_\pi$ input with respect to the power input. It will be appreciated from the discussion that follows that the M input may have an amplitude generally of the same magnitude as that of the control inputs.

*Inverter of FIG. 5*

In the logical arrangements of applicant's novel device, it will be convenient to employ a suitable inverter. Briefly, this inverter may consist of any device that will accept a periodic input at a first phase and render a periodic output, corresponding to said periodic input, but having its phase displaced 180° with respect to said first phase. That is, assuming a sine voltage wave input, the output will be a sine voltage wave having a phase displacement of 180° with respect to the sine voltage wave input. It will be appreciated by those skilled in the art, that the frequency of the system will largely determine the type of inverter employed. Suitable inverters may include electronic amplifiers, half wave length of coaxial cable, half wave length of a wave guide, half wave length of a parallel transmission line and numerous other structures known to the art.

*MAJORITY circuit of FIG. 6*

Now referring to FIG. 6, there is disclosed a block diagram representative of how applicant's invention may be employed to function as a MAJORITY circuit. Assume that a suitable power input is impressed on the power input terminal P of the device of FIG. 6, then the output of the device of FIG. 6 will be either a $\theta_0$ output or a $\theta_\pi$ output, depending on whether the majority of the inputs impressed on input terminals A, B and C of the device of FIG. 6 are of the $\theta_0$ type or of the $\theta_\pi$ type. In other words, if any two, or all three, of the three inputs to the device of FIG. 6 are of the $\theta_0$ type, a $\theta_0$ output will result. Correspondingly, if any two, or all three of the three inputs of the device of FIG. 6 are of the $\theta_\pi$ type, a $\theta_\pi$ output will result. Thus, it will be apparent that the device of FIG. 6 will function as a MAJORITY circuit in a logical arrangement employing suitable control and power inputs.

OR circuit of FIG. 7

Now referring to FIG. 7, there is disclosed a block diagram representative of how applicant's invention may be employed to function as an OR circuit. Assume that a suitable power input is impressed on the power input terminal P of the device of FIG. 7. Also, that an M input, i.e., an input having a time phase relationship of $\theta_\pi$ as defined earlier herein, is impressed on input terminal M of the device of FIG. 7. (The control inputs and M inputs are essentially of the same amplitude.) Then, the following conditions will exist. If the inputs impressed on input terminals A and B are, respectively, a $\theta_0$ input and a $\theta_\pi$ input, then the subharmonic output of the device of FIG. 7 will have a time phase relationship to the power input of $\theta_\pi$. This will hereinafter be referred to as an output of $\theta_\pi$. Correspondingly, if inputs A and B have respectively impressed thereon a $\theta_\pi$ input and a $\theta_0$ input, a $\theta_\pi$ output will result. Further, if the inputs A and B of the device of FIG. 7 are alike, the output will correspond thereto. That is, if the inputs impressed on terminal A and B of FIG. 7 are each of the $\theta_0$ type, a $\theta_0$ output will result. A $\theta_0$ output may be defined as a subharmonic output having a time phase relationship with respect to the power input corresponding to that of a $\theta_0$ input with respect to the power input. Correspondingly, when the inputs impressed on terminals A and B of the OR circuit of FIG. 7 are respectively of the $\theta_\pi$ type, a $\theta_\pi$ output will result. Thus it will be apparent that the device of FIG. 7 will function as an OR circuit in a logical arrangement employing suitable control, power, and M inputs.

It will be seen that when input terminal A of the device of FIG. 7 has impressed thereon a $\theta_0$ input, and input terminal B of said device has impressed thereon a $\theta_\pi$ input, that these inputs effectively [since they are of equal amplitude and displaced in phase 180°] cancel and the M input is effective in rendering a $\theta_\pi$ output. Thus it will be apparent that by employing an M input having a $\theta_0$ time phase relationship with respect to the power input, the OR circuit of FIG. 7 functions so as to render a $\theta_0$ output when a $\theta_0$ input is impressed on either input terminal A or input terminal B, or both, of the device of FIG. 7.

AND circuit of FIG. 8

Now referring to FIG. 8, there is disclosed a block diagram representative of applicant's invention employed to function as an AND circuit. Assume that a suitable power input is impressed on the power input terminal P of the device of FIG. 8. Also, assume that an M input is impressed on input terminal M of the device of FIG. 8. It will be recalled from the earlier discussion of the M input, that an M input has a $\theta_\pi$ time phase relationship to the power input. Further, as shown in FIG. 8, this M input is passed through an inverter prior to being impressed via a suitable resistor on the subharmonic generator SG. Thus, it will be apparent that the output of the inverter of FIG. 8 is an $M_1$ input, namely, an input having a time phase relationship of $\theta_0$ with respect to the power input. Then the following conditions will exist. When the inputs impressed on input terminals A and B of the device of FIG. 8 are respectively $\theta_0$ inputs, a $\theta_0$ output will result. When either one of the inputs impressed on input terminals A and B is a $\theta_0$ input, and the other input is a $\theta_\pi$ input, the output of the device of FIG. 8 will be a $\theta_0$ output. When the inputs impressed on input terminals A and B of the device of FIG. 8 are each $\theta_\pi$ inputs, then the output of said device will be a $\theta_\pi$ output. Thus, it will be apparent that the device of FIG. 8 will function as an AND circuit in a logical arrangement employing suitable control, power and M inputs.

Numerous modifications of the above OR, AND and MAJORITY circuits will be apparent to those skilled in the art. A few illustrative examples of these modifications are set forth hereinbelow:

(1) A higher frequency power input and correspondingly higher frequency control and M inputs may be employed.

(2) Each of the devices shown in FIGS. 6–8 may have a greater number of inputs than shown.

(3) An M input having a $\theta_0$ time phase relationship with respect to the power input may be employed.

(4) Any combination of the above three listed variations may be employed in a single unit.

(5) The mechanical switches, shown in FIGS. 1 and 2 and in the binary adders of FIGS. 9 and 10, may be replaced by suitable electronic switches known to the art.

(6) The invention may be embodied, or practiced, in a ternary, quaternary, quinary or higher based system.

It will be apparent to those skilled in the art that at higher frequencies, circuit components such as coaxial cables, wave guides, cavity resonators, and non-linear devices such as crystal diodes, semi-conductor devices, and the like, may be employed.

Binary adder of FIG. 9

FIG. 9 discloses the logical arrangement of AND, OR and MAJORITY circuits, generally of the afore-discussed type, to provide a binary adder. The binary adder of FIG. 9 will be disclosed in conjunction with an example illustrating a mode of operation thereof.

Reference is made to the binary adder of FIG. 9 and to the waveforms shown in FIGS. 9A through 9J. The power input or fundamental frequency represented by waveform $P_1$ of FIG. 9A is impressed on power input terminal $P_1$ of FIG. 9. It will now be apparent that by the selective opening and closing of switches $S_{11}$, $S_{12}$ and $S_{13}$ waveform P' (FIG. 9B), waveform P'' (FIG. 9C) and waveform P''' (FIG. 9D) will be respectively impressed on the power input terminal P of the following logical devices of the binary adder of FIG. 9: waveform P' is impressed on the power input terminals P of the MAJORITY circuit 100, the OR circuit 101, and the AND circuit 102, all shown in FIG. 9; waveform P'' is impressed on the power input terminals P of AND circuit 103 and AND circuit 104, both shown in FIG. 9; waveform P''' is impressed on the power input terminal P of OR circuit 105 of FIG. 9.

Let it now be assumed for purposes of explanation that in addition to waveform M (FIG. 9E) being impressed on input terminal M of the binary adder of FIG. 9, that waveforms A, B and C (shown in FIGS. 9F, 9G and 9H) are respectively impressed on input terminals $A_n$, $B_n$ and $C_n$ of the binary adder of FIG. 9. As will be seen from FIGS. 9A through 9J, the respective waveforms are all sketched to a time base reading from left to right. Now let it be assumed that the portions $A_1$, $A_2$, $A_3$ and $A_4$ of waveform A (FIG. 9F) respectively have the following time phase relationship to the power input $P_1$: $\theta_0$, $\theta_\pi$, $\theta_0$, $\theta_\pi$; that the portions $B_1$, $B_2$, $B_3$ and $B_4$ of waveform B (FIG. 9G) respectively have the following time phase relationship to the power input $P_1$: $\theta_\pi$, $\theta_\pi$, $\theta_0$ and $\theta_\pi$; and that the portions $C_1$, $C_2$, $C_3$ and $C_4$ of waveform C (FIG. 9H) respectively have the following time phase relationship with respect to the power input $P_1$: $\theta_0$, $\theta_0$, $\theta_\pi$, $\theta_\pi$. Then during time interval $T_1$ to $T_2$ (shown with respect to FIGS. 9A through 9J) the MAJORITY circuit 100 of the binary adder of FIG. 9 will have a $\theta_0$ input impressed on its input terminal A; a $\theta_\pi$ input impressed on its input terminal B and a $\theta_0$ input impressed on its input terminal C. This will result in a $\theta_0$ output from the MAJORITY circuit 100. This $\theta_0$ output, from MAJORITY circuit 100, is represented by the portion $D_1$ of waveform D of FIG. 9I.

Still referring to FIG. 9, it will be seen that during time interval $T_1$ to $T_2$, input terminals A, B and C of OR circuit 101 have respectively impressed thereon $\theta_0$, $\theta_\pi$ and $\theta_0$ inputs. Thus OR circuit 101 has a $\theta_\pi$ output. Further, input terminals A and B of AND circuit 102 have impressed thereon $\theta_\pi$ and $\theta_0$ inputs during time interval $T_1$ to $T_2$. This results in a $\theta_0$ output from AND circuit 102. Now it will be apparent that AND circuit 104 has a $\theta_0$ input on each of its three inputs and thus it has a $\theta_0$ output. (It will be noted that the center input of AND circuit 104 is an inverted M input or $\theta_0$ input.) AND circuit 103 has a $\theta_\pi$ input impressed on input terminal A, a $\theta_\pi$ input impressed on input terminal B and an inverted M input on its third input. Thus AND circuit 103 has a $\theta_\pi$ output. (The $\theta_\pi$ input impressed on input terminal A of AND circuit 103 is the $\theta_0$ output MA$\theta$ORITY circuit 100 [corresponding to portion $D_1$ of waveform D] inverted by inverter 103a.) It will now be apparent that input A of OR circuit 105 has impressed thereon a $\theta_\pi$ input which is the $\theta_\pi$ output of AND circuit 103. The $\theta_0$ input which is impressed on input terminal B of OR circuit 105 is the $\theta_0$ output of AND circuit 104. Thus OR circuit 105 will have a $\theta_\pi$ output corresponding to portion $E_1$ of waveform E of FIG. 9J. It will now be apparent that if a $\theta_\pi$ input corresponds to a binary digit 1 and a $\theta_0$ input corresponds to a binary digit 0, that the $\theta_0$ output represented by the portion $D_1$ of waveform D and the $\theta_\pi$ output represented by the portion $E_1$ of waveform E, are representative of the binary addition of portion $A_1$ of waveform A ($\theta_0$), portion $B_1$ of waveform B ($\theta_\pi$), and portion $C_1$ of waveform C ($\theta_0$).

Now consider the portions of waveforms A, B and C, namely, $A_2$, $B_2$ and $C_2$ that are impressed on input terminals $A_n$, $B_n$ and $C_n$ of the binary adder of FIG. 9 during time interval $T_2$ and $T_3$. It will be noted that $A_2$ is a $\theta_\pi$ input, $B_2$ is a $\theta_\pi$ input and $C_2$ is a $\theta_0$ input. Hence, the output of MAJORITY circuit 100, in response to inputs $A_2$, $B_2$ and $C_2$ will be a $\theta_\pi$ output represented by the portion $D_2$ of waveform D of FIG. 9I. This $\theta_\pi$ output of the MAJORITY circuit 100 will result in a $\theta_0$ input (as a result of the action of inverter 103A) being impressed on input terminal A of AND circuit 103. Hence, AND circuit 103 will have a $\theta_0$ output which is impressed on input terminal A of OR circuit 105. Input terminals A and B of AND circuit 102 respectively have impressed thereon, $\theta_\pi$ ($B_2$) and $\theta_0$ ($C_2$) inputs which result in a $\theta_0$ output from AND circuit 102. This $\theta_0$ output from AND circuit 102 is impressed on input terminal B of AND circuit 104 and results in a $\theta_0$ output from AND circuit 104 which is impressed on input terminal B of OR circuit 105. Thus it will be seen that input terminals A and B of OR circuit 105 each have impressed thereon a $\theta_0$ input resulting in a $\theta_0$ output from said OR circuit, which is represented by the portion $E_2$ of waveform E of FIG. 9J. Once again it will be seen that if $\theta_\pi$ inputs $A_2$ and $B_2$ are respectively representative of a binary digit 1 and $\theta_0$ input $C_2$ is representative of a binary digit 0, that $\theta_\pi$ output $D_2$ and $\theta_0$ output $E_2$ are representative of the binary addition of inputs $A_2$, $B_2$ and $C_2$. That is output $D_2$ represents a binary digit 1 "carry" output and output $E_2$ represents a binary digit 0 "sum" output. It will be appreciated that the binary orders of outputs $D_2$ and $E_2$ correspond to the binary orders of inputs $A_2$, $B_2$ and $C_2$. That is, the carry output represented by $D_2$ is a binary digit 1 carry from the binary order of inputs $A_2$, $B_2$ and $C_2$.

Now referring to waveforms A, B and C and more specifically to inputs $A_3$, $B_3$ and $C_3$ which respectively have a time phase relationship to power input $P_1$ of $\theta_0$, $\theta_0$ and $\theta_\pi$, it will be seen that the output of MAJORITY circuit 100 will be a $\theta_0$ output. This $\theta_0$ output of MAJORITY circuit 100 will be represented by the portion $D_3$ of waveform D of FIG. 9I. This $\theta_0$ output of MAJORITY circuit 100 also is effective via inverter circuit 103A in impressing a $\theta_\pi$ input on input terminal A of AND circuit 103. Input terminal C of OR circuit 101 has impressed thereon a $\theta_\pi$ input. Hence this OR circuit has a $\theta_\pi$ output. The $\theta_\pi$ output of OR circuit 101 is impressed on input terminal B of AND circuit 103. The $\theta_\pi$ output of AND circuit 103 is impressed on input terminal A of OR circuit 105 and results in a $\theta_\pi$ output therefrom that is represented by portion $E_3$ of waveform E of FIG. 9J. It will be apparent that outputs $D_3$ and $E_3$ respectively represent the binary carry and binary sum output of the binary addition of inputs $A_3$, $B_3$ and $C_3$.

Now referring to waveforms 9F, 9G and 9H, and more specifically to portions $A_4$ ($\theta_\pi$), $B_4$ ($\theta_\pi$) and $C_4$ ($\theta_\pi$), it will be seen that during time interval $T_4$ to $T_5$ all three inputs of MAJORITY circuit 100 have a $\theta_\pi$ input impressed thereon. Thus MAJORITY circuit 100 has a $\theta_\pi$ output. This $\theta_\pi$ output is represented by portion $D_4$ of waveform D of FIG. 9I. Also during time interval $T_4$ to $T_5$, $\theta_\pi$ inputs ($B_4$ and $C_4$) will be impressed on input terminals A and B of AND circuit 102 resulting in a $\theta_\pi$ output from said AND circuit. The $\theta_\pi$ input ($A_4$) and the $\theta_\pi$ output of AND circuit 102 are respectively impressed on input terminals A and B of AND circuit 104 and result in a $\theta_\pi$ output from AND circuit 104. This $\theta_\pi$ output from AND circuit 104 is impressed on input terminal B of OR circuit 105 and results in a $\theta_\pi$ output from OR circuit 105. This $\theta_\pi$ output from OR circuit 105 is represented by the portion $E_4$ of waveform E of FIG. 9J. It will be apparent that since all three inputs, namely $A_4$, $B_4$ and $C_4$ are $\theta_\pi$ type (representative of binary 1's) and since outputs $D_4$ and $E_4$ are each also of $\theta_\pi$ type (representative of binary 1's) that the device of FIG. 9 has performed binary addition, with the output $D_4$ representative of a binary "carry" output and the output $E_4$ representative of a binary "sum" output.

All of the afore-discussed examples, that is, employing inputs $A_1$, $B_1$, $C_1$, $A_2$, $B_2$, $C_2$ . . . $A_4$, $B_4$, $C_4$ and the resulting outputs $D_1$, $E_1$ . . . $D_4$, $E_4$ representative of binary digit combinations of inputs that a binary adder may be subjected to are tabulated in the chart shown in FIG. 11. The first vertical column represents inputs A, B, and C and outputs D and E. The first horizontal row represents the subscripts 1, 2, 3 and 4. For example, input $C_3$ is determined by proceeding horizontally in the row corresponding to C in the first column until it intersects with the column having a 3 in the first row. The other inputs and outputs are determined in like manner.

*Binary adder of FIG. 10*

FIG. 10 discloses the logical arrangement of a MAJORITY circuit and an AND-OR circuit, generally of the afore-discussed type, to provide a binary adder. The binary adder of FIG. 10 will be discussed in conjunction with an example illustrating a mode of operation thereof.

Reference is made to the binary adder of FIG. 10 and to the waveforms shown in FIGS. 10A through 10H. The power input or fundamental frequency represented by waveform $P_1$ of FIG. 10A is impressed on power input terminal $P_1$ of FIG. 10. It will now be apparent that by the selective opening and closing of switches $S_{11}$ and $S_{12}$, waveform P' (FIG. 10B) and waveform P" (FIG. 10C) will be respectively impressed on the power input terminal P of the following logical devices of the binary adder of FIG. 10: Waveform P' is impressed on the power input terminal P of the MAJORITY circuit 201 and waveform P" is impressed on the power input terminal P of AND-OR circuit 202.

Let it now be assumed for purposes of explanation, that waveforms A, B and C (shown in FIGS. 10D, 10E and 10F) are respectively impressed on input terminal $A_n$, $B_n$ and $C_n$ of the binary adder of FIG. 10. As will be seen from FIGS. 10A through 10H, the respective waveforms are all sketched to a time base reading from left to right. Now let it be assumed that the portions $A_1$, $A_2$, $A_3$ and $A_4$ of waveform A (FIG. 10D) respectively have the following time phase relationship to the power input $P_1$: $\theta_\pi$, $\theta_0$, $\theta_0$ and $\theta_\pi$; that the portions $B_1$, $B_2$, $B_3$ and $B_4$ of waveform B (FIG. 10E), respectively have the following time phase relationship to the power input $P_1$: $\theta_\pi$, $\theta_0$, $\theta_0$ and $\theta_\pi$; and that the portions $C_1$, $C_2$, $C_3$ and $C_4$ of waveform C (FIG. 10F), respectively have the following time phase relationship with respect to the power input $P_1$: $\theta_\pi$, $\theta_\pi$, $\theta_0$ and $\theta_0$.

Then during time interval $T_1$ to $T_2$ (shown with respect to FIGS. 10A through 10H) the MAJORITY circuit 201 of the binary adder of FIG. 10 will have a $\theta_\pi$ input impressed respectively on its A, B and C inputs. This will result in a $\theta_\pi$ output from the MAJORITY circuit 201. This $\theta_\pi$ output is represented by the portion $D_1$ of waveform D (FIG. 10G). Still referring to FIG. 10, it will be seen that during time interval $T_1$ to $T_2$, input terminals A, B and C of AND-OR circuit 202 have respectively impressed thereon a $\theta_\pi$ input. Further, the left-hand input of AND-OR circuit 202 is connected via a $$\frac{R}{2}$$

resistor to the output of inverter 201A. This inverter, 201A, converts the $\theta_\pi$ output, corresponding to portion $D_1$ of waveform D, from MAJORITY circuit 201 into a $\theta_0$ input to the left-hand input of AND-OR circuit 202. Thus AND-OR circuit 202 has a $\theta_\pi$ output corresponding to portion $E_1$ of waveform E (FIG. 10H).

It is to be appreciated at this point that the $$\frac{R}{2}$$

resistor serially connected in the left-hand input of AND-OR circuit 202 has twice the weighting factor as to amplitude, as compared to the R resistors respectively serially connected in the A, B, C inputs of said circuit. This follows from Kirchoff's Law for a resistance network.

Now consider the portions of the waveforms A, B and C, namely, $A_2$, $B_2$ and $C_2$ (FIGS. 10D through 10F), that are impressed on inputs terminals $A_n$, $B_n$ and $C_n$ of the binary adder of FIG. 10 during time interval $T_2$ to $T_3$. It will be noted that $A_2$ has a $\theta_0$ input, $B_2$ has a $\theta_0$ input and $C_2$ has a $\theta_\pi$ input. Hence, the output of MAJORITY circuit 190, in response to inputs $A_2$, $B_2$ and $C_2$, will be a $\theta_0$ output represented by the portion $D_2$ of waveform D of FIG. 10G. This $\theta_0$ output of MAJORITY circuit 201 will result in a $\theta_\pi$ input (as a result of the action of inverter 201A) being impressed on the left-hand input terminal of AND-OR circuit 202. During time interval $T_2$ to $T_3$ inputs A, B and C of AND-OR circuit 202 will have respectively impressed thereon a $\theta_0$ input, a $\theta_0$ input and a $\theta_\pi$ input. These inputs in conjunction with the output of inverter 201A will result in a $\theta_\pi$ output from AND-OR circuit 202. This $\theta_\pi$ output is represented by the portion $E_2$ of waveform E (FIG. 10H).

It will now be apparent that the portions $A_3$, $B_3$ and $C_3$ of waveforms A, B and C (FIG. 10D, 10E and 10F) which are respectively of the $\theta_0$ type, will result in a $\theta_0$ output (represented by portion $D_3$ of waveform D) from MAJORITY circuit 201, and a $\theta_0$ output (represented by portion $E_3$ of waveform E) from AND-OR circuit 202.

Further, the inputs $A_4$, $B_4$ and $C_4$ during time intervals $T_4$ to $T_5$ will result in outputs $D_4$ ($\theta_\pi$) and $E_4$ ($\theta_0$) respectively from the MAJORITY circuit 201 and the AND-OR circuit 202 of FIG. 10.

It will be apparent that the circuits of FIGS. 9 and 10 may be employed as full binary adders wherein a $\theta_\pi$ input represents one binary digit and a $\theta_0$ input represents the other binary digit.

*Observing the phase relationship between power input and control input of the embodiments of FIGS. 1 and 2*

A convenient arrangement for observing the time-phase relationship existing between the power input (i.e., amplitude modulated 1 megacycle sine voltage wave) and the subharmonic output (i.e., .5 megacycle sine voltage wave) is to employ the 500 kilocycle blanking pulses, obtained from the positive pulse selection circuit of FIG. 2B, as a timing base applied to the cathode of the cathode ray tube of FIG. 1B. The vertical deflection potential for the oscilloscope is obtained by placing switch $S_3$ of FIG. 1B in position 2 or 4 thereof. The pattern on the screen of the oscilloscope will then be indicative of the phase relationship existing between the subharmonic output, control input and the power input. It will be appreciated that patterns also may be obtained indicative of the phase relationships of the control input with respect to the power input and the subharmonic output.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electronic binary adder, wherein a binary "1" is represented by a periodic electrical wave having a first phase relationship with respect to a reference standard and a binary "0" is represented by said periodic electrical wave having a second phase relationship with respect to said reference standard: said electronic binary adder consisting in combination of: a first input terminal for accepting a first periodic electrical wave having either said first phase relationship representative of a binary "1," or said second phase relationship representative of a binary "0": a second input terminal for accepting a second periodic electrical wave having either said first phase relationship representative of a binary "1," or said second phase relationship representative of a binary "0": a third input terminal for accepting a third periodic electrical wave having either said first phase relationship representative of a binary "1," or said second phase relationship representative of a binary "0": a first subharmonic generator having a first input terminal, a second input terminal and an output terminal, said first subharmonic generator employing a serial circuit consisting of a lumped parameter inductance and a non-linear lumped parameter capacitance; a second subharmonic generator having a first input terminal, a second input terminal and an output terminal, said second subharmonic generator employing a serial circuit consisting of a lumped parameter inductance and a non-linear lumped parameter capacitance; a first resistor having a magnitude of R ohms, said first resistor being connected between said first input of said binary adder and said first input of said first subharmonic generator: a second resistor having a resistance of R ohms, said second resistor being connected between said second input terminal of said binary adder and said first input terminal of said first subharmonic generator: a third resistor having a resistance of R ohms, said third resistor being connected between said third input terminal of said binary adder and said first input of said first subharmonic generator; a fourth resistor having a resistance of R ohms, said fourth resistor being connected between said first input terminal of said binary adder and said first input terminal of said second subharmonic generator: a fifth resistor having a resistance of R ohms, said fifth resistor being connected between said second input terminal of said binary adder and said first input terminal of said second subharmonic generator; a sixth resistor having a resistance of R ohms, said sixth resistor being connected between said third input terminal of said binary adder and said first input terminal of said second subharmonic generator: a series circuit consisting of an inverter and a seventh resistor having a resistance of R/2 ohms, said series circuit being connected between said output terminal of said first subharmonic generator and said first input terminal of said second subharmonic generator: power source means connected to said second input of said first subharmonic generator and to said second input of said second subharmonic generator, said power source means producing a periodic electrical wave whose phase constitutes said reference standard; a carry output terminal, said carry output terminal being connected to said output terminal of said first subharmonic generator; a sum output terminal, said sum output terminal being connected to said output terminal of said second subharmonic generator; whereby, a carry periodic electrical wave having said first phase relationship with respect to said reference standard, and representative of a binary "1," will be present at said carry output terminal when all three, or any two, of said first, second and third periodic electrical waves respectively have said first phase relationship with respect to said reference standard, a carry periodic electrical wave having said second phase relationship with respect to said reference standard and representative of a binary "0," will be present at said carry output terminal when none, or only any one, of said first, second and third periodic electrical waves have said first phase relationship with respect to said reference standard, a sum periodic electrical wave having said first phase relationship with respect to said reference standard and representative of a binary "1," will be present at said sum output terminal when all three, or only any one, of said first, second and third periodic electrical waves have said first phase relationship with respect to said reference standard, and a sum periodic electrical wave having said second phase relationship with respect to said reference standard and representative of a binary "0" will be present at said sum output terminal when all three, or only any one, of said first, second and third periodic electrical waves have said second phase relationship with respect to said reference standard.

2. Electronic apparatus for employment as a source of potential in an electronic computing system, wherein a binary "1" is represented by a periodic electrical wave having a first phase relationship with respect to a reference standard and a binary "0" is represented by said periodic electrical wave having a second phase relationship with respect to said reference standard, said electronic apparatus consisting in combination of: a first input terminal for accepting a one megacycle sine voltage wave; a first amplifier having an input and an output, said input of said first amplifier being connected to said first input terminal of said electronic apparatus; a first squaring network having an input and an output, said input of said first squaring network being connected to said output of said first amplifier, a second amplifier having an input and output, said input of said second amplifier being connected to said output of said first squaring network; a second squaring network having an input and an output, said input of said second squaring network being connected to said output of said second amplifier; a third amplifier having an input and an output, said input of said third amplifier being connected to said output of said second squaring network; a differentiating circuit having an input and output, said input of said differentiating network being connected to said output of said third amplifier circuit: a multivibrator circuit having an input and first and second outputs, said input of said multivibrator being connected to said output of said differentiating circuit; a first cathode follower having an input and an output, said input of said first cathode follower being connected to said first output of said multivibrator; a second cathode follower having an input and an output, said input of said second cathode follower being connected to said second output of said multivibrator; a first wave shaping network having an input and an output, said input of said first wave shaping network being connected to said output of said first cathode follower; a second wave shaping network having an input and an output, said input of said second wave shaping network being connected to said output of said second cathode follower; phase shift network means including switch means and having first and second inputs and an output, said first input of said phase shift network means being connected to said output of said first wave shaping network, and said second input of said phase shift network being connected to said output of said second wave shaping network; a first tuned amplifier having an input and an adjustable output, said input of said tuned amplifier being connected to the output of said phase shift network means; said electronic apparatus having a second input terminal for accepting a one kilocycle square voltage wave; a resistance-capacitance network having an input and an output, said input of said resistance-capacitance network being connected to said second input terminal of said electronic apparatus; an integrating amplifier having an input and an output, said input of said integrating amplifier being connected to said output of said resistance-capacitance network; a differential amplifier having an input and first and second outputs, said input of said differential amplifier being connected to said output of said integrating amplifier; a level setting circuit having first and second inputs and first and second outputs, said first and second inputs of said level setting circuit being respectively connected to said first and second outputs of said differential amplifier; a third cathode follower having an input and an output, said input of said third cathode follower being connected to said first output of said level setting circuit; a fourth cathode follower having an input and an output, said input of said fourth cathode follower being connected to said second output of said level setting circuit; a modulating network having first, second and third inputs and an output, said first input of said modulating network being connected to the output of said third amplifier, said second input of said modulating network being connected to said output of said third cathode follower, and said third input of said modulating network being connected to said output of said fourth cathode follower; a filter circuit having an input and an output, said input of said filter circuit being connected to said output of said modulating network; a second tuned amplifier having an input an an output, said input of said tuned amplifier being connected to said output of said filter circuit; a fifth cathode follower having an input and an output, said input of said fifth cathode follower being connected to said output of said second tuned amplifier; a variable output circuit having an input and an output, said input of said variable output circuit being connected to said output of said fifth cathode follower; a mixing amplifier having first and second inputs and an output, said first input of said mixing amplifier being connected to said output of said first tuned amplifier, and said second input of said mixing amplifier being connected to said output of variable output circuit; a fourth amplifier having an input and an output, said input of said fourth amplifier being connected to said output of said mixing amplifier; a serial circuit consisting of a non-linear capacitance, an inductance, and a one hundred and fifty ohm resistor connected in series, said serial circuit being connected to the output of said fourth amplifier, whereby under control of said switch means said periodic electrical wave having said first phase relationship with respect to said standard and representative of a binary "1," or said periodic electrical wave having said second phase relationship with respect to said standard and representative of a binary "0," will be manifested by the potential appearing across said one hundred and fifty ohm resistor.

References Cited in the file of this patent
UNITED STATES PATENTS

| | | |
|---|---|---|
| 1,544,381 | Elmen et al. | June 30, 1925 |
| 2,088,618 | Stocker | Aug. 3, 1937 |

(Other references on following page)

UNITED STATES PATENTS

| | | | |
|---|---|---|---|
| 2,390,773 | Brinton | Dec. 11, | 1945 |
| 2,443,094 | Carlson et al. | June 8, | 1948 |
| 2,461,307 | Antalek | Feb. 8, | 1949 |
| 2,555,959 | Curtis | June 5, | 1951 |
| 2,652,501 | Wilson | Sept. 15, | 1953 |
| 2,693,907 | Tootill | Nov. 9, | 1954 |
| 2,696,530 | Kerns | Dec. 7, | 1954 |
| 2,697,825 | Lord | Dec. 21, | 1954 |
| 2,723,354 | Isborn | Nov. 8, | 1955 |
| 2,758,787 | Felker | Aug. 14, | 1956 |
| 2,812,135 | Allen | Nov. 5, | 1957 |
| 2,815,488 | Von Neumann | Dec. 3, | 1957 |
| 2,838,687 | Clary | June 10, | 1958 |

FOREIGN PATENTS

| | | | |
|---|---|---|---|
| 778,883 | Great Britain | July 10, | 1957 |

OTHER REFERENCES

"Resonant Dielectric Amplifier Frequency Response," by Penney et al., Electrical Engineering (AIEE), April 1954, page 311.

Publication I: "A Radio Frequency Nondestructive Readout for Magnetic-Core Memories," by Bernard Widrow, published December 1954, in IRE Transactions-Electronic Computers, vol. EC-3, Issue 4, pp. 12–15.

Automatic Digital Computers, by M. V. Wilkes, published June 14, 1956, by John Wiley & Sons Inc., New York. Page 212 (FIG. 6.6) relied on.